United States Patent
Farrugia et al.

(10) Patent No.: US 12,060,461 B2
(45) Date of Patent: Aug. 13, 2024

(54) SPHERICAL PARTICLES COMPRISING CARBON NANOMATERIAL-GRAFT-POLYAMIDE AND METHODS OF PRODUCTION AND USES THEREOF

(71) Applicant: Xerox Corporation, Norwalk, CT (US)

(72) Inventors: Valerie M. Farrugia, Oakville (CA); Shivanthi Easwari Sriskandha, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 477 days.

(21) Appl. No.: 17/321,823

(22) Filed: May 17, 2021

(65) Prior Publication Data

US 2022/0363840 A1   Nov. 17, 2022

(51) Int. Cl.
| | | |
|---|---|---|
| C09D 11/52 | (2014.01) | |
| B29C 64/153 | (2017.01) | |
| B33Y 10/00 | (2015.01) | |
| B33Y 70/00 | (2020.01) | |
| C08G 83/00 | (2006.01) | |
| C08K 3/04 | (2006.01) | |
| C08L 77/00 | (2006.01) | |
| C08L 77/02 | (2006.01) | |
| C08L 77/06 | (2006.01) | |
| C09D 177/00 | (2006.01) | |

(52) U.S. Cl.
CPC .......... *C08G 83/001* (2013.01); *B29C 64/153* (2017.08); *B33Y 10/00* (2014.12); *B33Y 70/00* (2014.12); *C08K 3/041* (2017.05); *C08L 77/02* (2013.01); *C08L 77/06* (2013.01); *C08K 2201/003* (2013.01); *C08K 2201/011* (2013.01)

(58) Field of Classification Search
None
See application file for complete search history.

(56) References Cited

U.S. PATENT DOCUMENTS

| | | | | |
|---|---|---|---|---|
| 2013/0240799 A1* | 9/2013 | Haeger | ................... | C08L 77/02 252/511 |
| 2021/0069958 A1* | 3/2021 | Farrugia | ................. | B29C 48/04 |

FOREIGN PATENT DOCUMENTS

| | | |
|---|---|---|
| CN | 103319724 | 9/2013 |
| CN | 103980609 | 8/2014 |
| CN | 105315456 | 2/2016 |
| CN | 106478988 A | 3/2017 |
| CN | 106633373 | 5/2017 |
| CN | 106830790 | 6/2017 |
| EP | 3760412 | 1/2021 |
| JP | 2014-101401 | 5/2014 |
| JP | 2020002247 | 1/2020 |

OTHER PUBLICATIONS

Akbar, S., Beyou, E., Chaumont, P., Mazzolini, J., Espinosa, E., D'agosto, F. and Boisson, C. (2011), Synthesis of polyethylene-grafted multiwalled carbon nanotubes via a peroxide-initiating radical coupling reaction and by using well defined TEMPO and thiol end-functionalized polyethylenes. J. Polym. Sci. A Polym. Chem., 49: 957-965.
Yang, B.-X., Pramoda, K., Xu, G. and Goh, S. (2007), Mechanical Reinforcement of Polyethylene Using Polyethylene-Grafted Multiwalled Carbon Nanotubes. Adv. Funct. Mater., 17: 2062-2069.
Redzic, E., Garoff, T., Mardare, C.C. et al. Heterogeneous Ziegler—Natta catalysts with various sizes of MgCl2 crystallites: synthesis and characterization. Iran Polym J 25, 321-337 (2016).
Huanmin Li, Xu-Ming Xie. Polyolein-functionalized graphene oxide and its GO/HDPE nanocomposite with excellent mechanical properties[J]. Chin. Chem. Lett., 2018, 29(1): 161-165.
Kausar, A. Polyamide-grafted-multi-walled carbon nanotube electrospun nanofibers/epoxy composites. Fibers Polymer 15, 2564-2571 (2014).
Hohimer Cameron J et al: "Electrical conductivity and piezoresistive response of 3D printed thermoplastic polyurethane/multiwalled carbon nanotube composites", Proceedings of SPIE; [Proceedings of SPIE SSN 0277-786X vol. 10524], SPIE, US, vol. 10596, Mar. 22, 2018 (Mar. 22, 2018), pp. 105960J-105960J, XP060102310, DOI: 10.1117/12.2296774; ISBN: 978-1-5106-1533-5 * Chapters 2.1 and 2.2 *.
Office Action in related CA application 3,158,073 dated Oct. 20, 2023.

* cited by examiner

Primary Examiner — Michael J Feely
(74) Attorney, Agent, or Firm — Vorys, Sater, Seymour and Pease LLP

(57) ABSTRACT

A nonlimiting example method of forming highly spherical carbon nanomaterial-graft-polyamide (CNM-g-polyamide) polymer particles may comprising: mixing a mixture comprising: (a) carbon nanomaterial-graft-polyamide (CNM-g-polyamide), wherein the CNM-g-polyamide particles comprises: a polyamide grafted to a carbon nanomaterial, (b) a carrier fluid that is immiscible with the polyamide of the CNM-g-polyamide, optionally (c) a thermoplastic polymer not grafted to a CNM, and optionally (d) an emulsion stabilizer at a temperature greater than a melting point or softening temperature of the polyamide of the CNM-g-polyamide and the thermoplastic polymer, when included, and at a shear rate sufficiently high to disperse the CNM-g-polyamide in the carrier fluid; cooling the mixture to below the melting point or softening temperature to form CNM-g-polyamide particles; and separating the CNM-g-polyamide particles from the carrier fluid.

19 Claims, 4 Drawing Sheets

SPHERICAL PARTICLES COMPRISING CARBON NANOMATERIAL-GRAFT-POLYAMIDE AND METHODS OF PRODUCTION AND USES THEREOF

FIELD

The present disclosure relates to highly spherical particles that comprises carbon nanomaterial-graft-polyamide (CNM-g-polyamide). The present disclosure further relates to compositions, synthesis methods, and applications of such particles (also referred to herein as CNM-g-polyamide particles).

BACKGROUND

Thermoplastic polymers are often used to make extruded objects like films, bags, particles, and filaments. One example of a thermoplastic polymer is a polyamide. Polyamides like nylons are off-white colored polymers that have the ability to withstand elevated or low temperatures without loss of physical properties. Therefore, objects formed with thermoplastic polymers such as the polyamides can be used in demanding applications like power tools, automotive parts, gears, and appliance parts. Three-dimensional (3-D) printing, also known as additive manufacturing, is increasingly used to produce such objects. Selective laser sintering has enabled the direct manufacture of three-dimensional objects of high resolution and dimensional accuracy from a variety of materials including polystyrene, NYLON, other plastics, and composite materials, such as polymer coated metals and ceramics.

Polyamide is one of the most common polymers used in additive manufacturing because of its flow properties, lower cost than other polymers, and desirable sintering window. However, physical properties needed in objects produced by additive manufacturing may be beyond those of a polyamide. Expanding the methods by which polyamide-carbon nanomaterial composites can be manufactured into objects would further expand the polymer composite industry.

SUMMARY

The present disclosure relates to highly spherical particles that comprises CNM-g-polyamide. The present disclosure further relates to compositions, synthesis methods, and applications of such particles (also referred to herein as CNM-g-polyamide particles).

Disclosed herein are methods of selective laser sintering that comprise: depositing CNM-g-polyamide particles optionally in combination with other thermoplastic polymer particles onto a surface, wherein the CNM-g-polyamide particles comprise a polyamide grafted to a carbon nanomaterial (CNM); and after deposited, exposing at least a portion of the CNM-g-polyamide particles to a laser to fuse the polymer particles thereof and form a consolidated body by selective laser sintering.

Disclosed herein are methods that comprise: mixing a mixture comprising: (a) a CNM-g-polyamide, wherein the CNM-g-polyamide comprises: a polyamide grafted to a carbon nanomaterial, (b) a carrier fluid that is immiscible with the polyamide of the CNM-g-polyamide, optionally (c) a thermoplastic polymer not grafted to a CNM, and optionally (d) an emulsion stabilizer at a temperature greater than a melting point or softening temperature of the polyamide of the CNM-g-polyamide and the thermoplastic polymer, when included, and at a shear rate sufficiently high to disperse the CNM-g-polyamide in the carrier fluid; cooling the mixture to below the melting point or softening temperature to form CNM-g-polyamide particles; and separating the CNM-g-polyamide particles from the carrier fluid.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
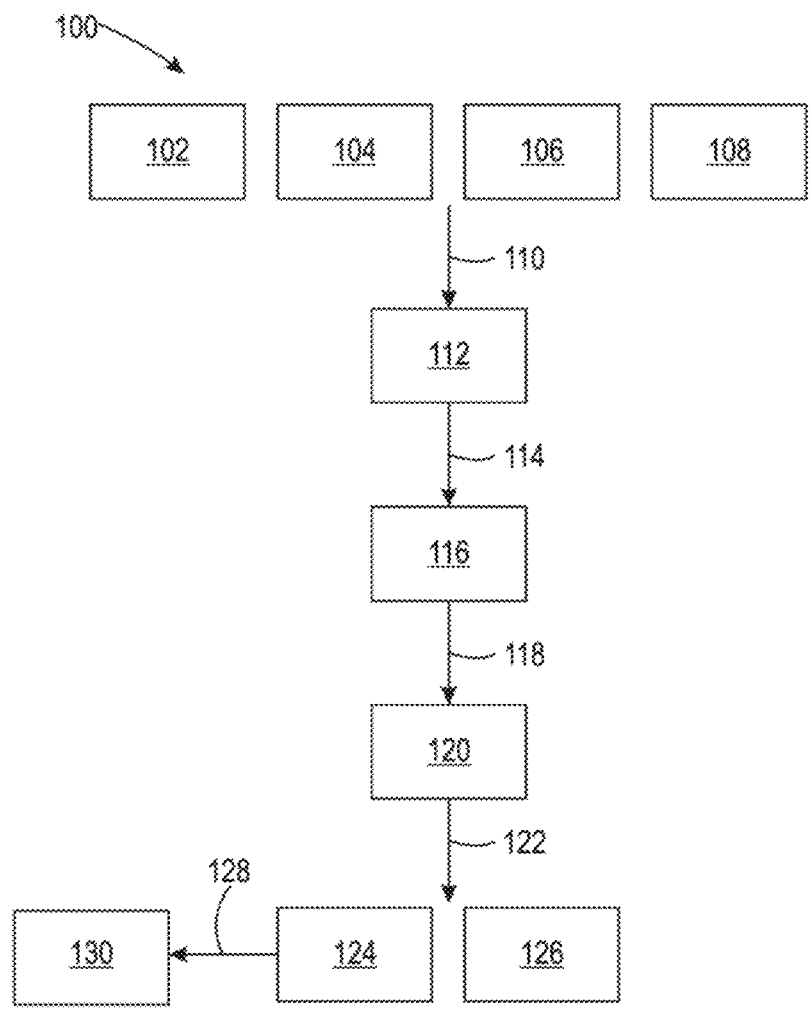
FIG. 1 is a flow chart of a nonlimiting example method of the present disclosure.

The present disclosure relates to highly spherical particles that comprises carbon nanomaterial-graft-polyamide (CNM-g-polyamide). The present disclosure further relates to compositions, synthesis methods, and applications of such particles (also referred to herein as CNM-g-polyamide particles).

Three-dimensional (3-D) printing, also known as additive manufacturing, is a rapidly growing technology area. Although 3-D printing has traditionally been used for rapid prototyping activities, this technique is being increasingly employed for producing commercial and industrial objects, which may have entirely different structural and mechanical tolerances than do rapid prototypes.

3-D printing operates by depositing either (a) small droplets or streams of a melted or solidifiable material or (b) powder particulates in precise deposition locations for subsequent consolidation into a larger object, which may have any number of complex shapes. Such deposition and consolidation processes typically occur under the control of a computer to afford layer-by-layer buildup of the larger object. In a particular example, consolidation of powder particulates may take place in a 3-D printing system using a laser to promote selective laser sintering (SLS).

Powder particulates usable in 3-D printing include thermoplastic polymers, including thermoplastic elastomers, metals, and other solidifiable substances. When using a composites in 3-D printing, the particulates (e.g., the carbon nanomaterial of a polyamide-carbon nanomaterial composites) should be evenly dispersed throughout the small melted droplets or the powder particulate, or the distribution of the particulates of the final object will be uneven. Accordingly, the properties (e.g., strength and/or electrical conductivity) of the object may also be irregular, which may introduce points of failure to the object.

The present disclosure relates to highly spherical particles that comprises carbon nanomaterial-graft-polyamide (CNM-g-polyamide). Advantageously, the compositions and methods of the present disclosure use in situ polymerization of the polyamides. Therefore, the desirable melt and flow properties of the polyamides may be exploited during the additive manufacturing methods. The CNM-g-polyamide particles may be useful, among other things, as starting material for additive manufacturing, especially SLS 3-D printing. The carbon nanomaterials (CNMs) may improve the physical properties and/or impart new physical properties to the object produced by additive manufacturing. Further, by using CNM-g-polyamide, the CNMs may be well dispersed and/or distributed through in the polymer particles. Therefore, the carbon nanomaterials may be well dispersed and/or distributed through the object (or portion thereof) that is produced by additive manufacturing.

Further, the present disclosure relates to polyamide thermoplastic polymer composites that are covalently bound to CNMs such as carbon nanotubes (CNTs) and methods of preparing highly spherical CNM-g-polyamide particles from the said polyamide thermoplastic polymer composites. Non-limiting example of CNTs may include single walled carbon nanotubes (SWCNT), multi-walled (MWCNT), double-walled (DWCNT). For example, CNTs may be functionalized with diamines and/or diacids by polycondensation, by interfacial polymerization, or by ring open polymerization (ROP) with lactams. In some cases, functionalization of CNTs with carboxylic acid moieties may be carried out in presence of sulfuric acid, nitric acid, chlorate or ammonium persulfate oxidation. Alternately, functionalization of CNTs may be carried out by direct sulfonation, metalation, and electrophilic addition to the deoxygenated surfaces of CNTs. The covalent modification of CNTs with functional groups (e.g., amino group or carboxylic acid) may be further reacted with monomer units, oligomers, or directly reacted to a longer polymer chain of polyamide to improve the dispersion capabilities of the CNTs within the polymer matrix and be readily integrated within the polymer to form the corresponding polyamide thermoplastic polymer nanocomposite.

Advantageously, highly spherical CNM-g-polyamide particles/powder can be produced from the polyamide thermoplastic polymer composites of the present disclosure via, for example, melt emulsification, cryomilling, and/or precipitation. The said highly spherical CNM-g-polyamide particles may be sintered for 3D printing applications using a SLS printer.

Consequently and advantageously, parts or objects SLS printed from the highly spherical CNM-g-polyamide particles of the present disclosure have improved mechanical properties when compared to polyamide-based microparticles not compounded with polyamide thermoplastic polymer composites of the present disclosure.

Definitions and Test Methods

As used herein, the term "immiscible" refers to a mixture of components that, when combined, form two or more phases that have less than 5 wt % solubility in each other at ambient pressure and at room temperature or the melting point of the component if it is solid at room temperature. For example, polyethylene oxide having 10,000 g/mol molecular weight is a solid room temperature and has a melting point of 65° C. Therefore, said polyethylene oxide is immiscible with a material that is liquid at room temperature if said material and said polyethylene oxide have less than 5 wt % solubility in each other at 65° C.

As used herein, the term "polyamide monomer(s)" refers to a monomer(s) that form a polyamide.

As used herein, the term "polyacid" when referring to a compound refers to a compound having two or more carboxylic acid moieties. Herein, anhydride moieties are considered carboxylic acid moieties because the anhydrides open to carboxylic acids during synthesis.

As used herein, the term "polyamine" when referring to a compound refers to a compound having two or more amine moieties.

As used herein, the term "amino acid" when referring to a compound refers to a compound having one or more carboxylic acid moieties and one or more amine moieties. Again, anhydride moieties are considered carboxylic acid moieties because the anhydrides open to carboxylic acids during synthesis.

When referring to a polymer in terms of the -mer units (e.g., polyamide monomers), it would be understood by one skilled in the art that the -mer units are in the polymerized form in the polymer.

As used herein, the term "thermoplastic polymer" refers to a plastic polymer material that softens and hardens reversibly on heating and cooling. Thermoplastic polymers encompass thermoplastic elastomers.

As used herein, the term "elastomer" refers to a copolymer comprising a crystalline "hard" section and an amorphous "soft" section. In the case of a polyurethane, the crystalline section may include a portion of the polyurethane comprising the urethane functionality and optional chain extender group, and the soft section may include the polyol, for instance.

As used herein, the term "polyurethane" refers to a polymeric reaction product between a diisocyanate, a polyol, and an optional chain extender.

As used herein, the term "oxide" refers to both metal oxides and non-metal oxides. For purposes of the present disclosure, silicon is considered to be a metal.

As used herein, the terms "carbon nanomaterial-graft-polyamide" and "CNM-g-polyamide" refer to a carbon nanomaterial as a central or backbone structure having a polyamide extending therefrom. These terms do not imply the method by which the structure is produced but rather describe the structure itself.

As used herein, the term "carbon nanomaterial" refers to molecules or particles having at least one dimension being 50 nm or less where the core structure of the particle is composed of at least 50 atomic % carbon. Examples of carbon nanomaterials include, but are not limited to, fullerenes, carbon nanotubes, graphites, graphenes, and any combinations thereof.

As used herein, the term "fullerene" refers to particles or molecules having a cage as the core structure and the cage structure having an aspect ratio of 10 or less.

As used herein, the term "carbon nanotube" refers to particles or molecules having an elongated, cylindrical structure as the core structure and the elongated, cylindrical structure having an aspect ratio of more than 10. As used herein, the term "carbon nanotube" encompasses single-walled carbon nanotube (i.e., having one wall), double-walled carbon nanotube (i.e., having two walls), and multi-walled carbon nanotube (i.e., having two or more walls).

As used herein, the term "graphene" refers to particles or molecules having a planar graphitic structure and encompasses single-layer graphene to three-layer graphene.

As used herein, the term "graphite" refers to particles or molecules having more than three layers planar graphite.

The terms "carbon nanomaterial," "fullerene," "carbon nanotubes," "graphite," and "graphene" encompass functionalized versions thereof.

As used herein, the term "embed" relative to particles (e.g., nanoparticles) and a surface of a polymer particle refers to the particle being at least partially extending into the surface of the polymer particle such that polymer is in contact with the nanoparticle to a greater degree than would be if the nanoparticle were simply laid on the surface of the polymer particle.

Herein, D10, D50, D90, and diameter span are primarily used herein to describe particle sizes. As used herein, the term "D10" refers to a diameter below which 10% (on a volume-based distribution, unless otherwise specified) of the particle population is found. As used herein, the terms "D50", "average particle diameter," and "average particle size" refers to a diameter below which 50% (on a volume-based median average, unless otherwise specified) of the particle population is found. As used herein, the term "D90" refers to a diameter below which 90% (on a volume-based distribution, unless otherwise specified) of the particle population is found. As used herein, the terms "diameter span" and "span" and "span size" when referring to diameter provides an indication of the breadth of the particle size distribution and is calculated as (D90-D10)/D50.

Particle diameters and particle size distributions are determined by light scattering techniques using a Malvern MASTERSIZER™ 3000. For light scattering techniques, the control samples were glass beads with a diameter within the range of 15 µm to 150 µm under the tradename Quality Audit Standards QAS4002' obtained from Malvern Analytical Ltd. Samples were analyzed as dry powders, unless otherwise indicated. The particles analyzed were dispersed in air and analyzed using the AERO S' dry powder dispersion module with the MASTERSIZER™ 3000. The particle sizes were derived using instrument software from a plot of volume density as a function of size.

As used herein, when referring to sieving, pore/screen sizes are described per U.S.A. Standard Sieve (ASTM E11-17).

As used herein, the terms "circularity" relative to the particles refer to how close the particle is to a perfect sphere. To determine circularity, optical microscopy images using flow particle imaging are taken of the particles. The perimeter (P) and area (A) of the particle in the plane of the microscopy image is calculated (e.g., using a SYSMEX FPIA 3000 particle shape and particle size analyzer, available from Malvern Instruments). The circularity of the particle is $C_{EA}/P$, where $C_{EA}$ is the circumference of a circle having the area equivalent to the area (A) of the actual particle. Herein, the circularity is based on three runs through a SYSMEX FPIA 3000 particle shape and particle size analyzer, where 6,000 to 10,000 particles are analyzed per run. The reported circularity is the median average circularity based on particle number. In the analysis, a threshold for distinguishing the greyscale levels between the background pixels and the particle pixels (e.g., to correct for non-uniform illumination conditions) was set at 90% of the background modal value.

As used herein, the term "shear" refers to stirring or a similar process that induces mechanical agitation in a fluid.

As used herein, the term "aspect ratio" refers to length divided by width, wherein the length is greater than the width.

The melting point of a polymer, unless otherwise specified, is determined by ASTM E794-06(2018) with 10° C./min ramping and cooling rates.

The softening temperature or softening point of a polymer, unless otherwise specified, is determined by ASTM D6090-17. The softening temperature can be measured by using a cup and ball apparatus available from Mettler-Toledo using a 0.50 gram sample with a heating rate of 1° C./min.

Angle of repose is a measure of the flowability of a powder. Angle of repose measurements were determined using a Hosokawa Micron Powder Characteristics Tester PT-R using ASTM D6393-14 "Standard Test Method for Bulk Solids" Characterized by Carr Indices."

Aerated density ($\rho_{aer}$) is measured per ASTM D6393-14.
Bulk density ($\rho_{bulk}$) is measured per ASTM D6393-14.
Tapped density ($\rho_{tap}$) is measured per ASTM D6393-14.
Hausner ratio ($H_r$) is a measure of the flowability of a powder and is calculated by $H_r=\rho_{tap}/\rho_{bulk}$, where $\rho_{bulk}$ is the bulk density per ASTM D6393-14 and $\rho_{tap}$ is the tapped density per ASTM D6393-14.

As used herein, viscosity of carrier fluids are the kinematic viscosity at 25° C., unless otherwise specified, measured per ASTM D445-19. For commercially procured carrier fluids (e.g., polydimethylsiloxane oil), the kinematic viscosity data cited herein was provided by the manufacturer, whether measured according to the foregoing ASTM or another standard measurement technique.

The crystallization temperature (° C.), unless otherwise specified, is determined by ASTM D3417. The crystallization temperature is the temperature at which a polymer crystallizes (i.e., solidification) into a structured form, naturally or in an artificially initiated process, wherein atoms or molecules are highly organized into a crystal. The crystallization temperature may be measured by Differential Scanning Calorimetry (DSC). DSC provides a rapid method for determining polymer crystallinity based on the heat required to melt the polymer.

The crystallinity (%) of a polymer, unless otherwise specified, is determined by ASTM D3417, by quantifying the heat associated with melting (fusion) of the polymer.

The Melt Flow Index (MFI) is the measure of resistance to flow of polymer melt under defined set of conditions (unit: g/10 min). Being a measure at low shear rate condition, MFI is inversely related to molecular weight of the polymer.

The dimensional accuracy of SLS part (%) is a quantitative measure of the accuracy of a 3D printed sintered parts of SLS.

As used herein, "tensile modulus" (MPa) of a solid material is a mechanical property that measures its stiffness. It is defined as the ratio of its tensile stress (force per unit area) to its strain (relative deformation) when undergoing elastic deformation. It can be expressed in Pascals or pounds per square inch (psi). ASTM D638-14 can be used to determine tensile modulus of a polymer.

CNM-g-Polyamide Composites

Examples of CNM that may have a polyamide grafted thereto include, but are not limited to, fullerenes, carbon nanotubes (e.g., single walled carbon nanotubes, double walled carbon nanotubes, multiwalled carbon nanotubes, and the like), graphite (e.g., graphite particles, highly-oxidized graphite particles, and the like), graphene (e.g., graphene particle, graphene ribbons, graphene sheets, and the like, and highly-oxidized derivatives thereof), and the like, and any combinations thereof.

The CNM-g-polyamide may comprises about 50 wt % to about 99.95 wt % (or about 55 wt % to about 95 wt %, or about 60 wt % to about 90 wt %, or about 65 wt % to about 85 wt %, or about 70 wt % to about 80 wt %) of the polyamide, and about 0.05 wt % to about 50 wt % (or about 5 wt % to about 45 wt %, or about 10 wt % to about 40 wt %, or about 15 wt % to about 35 wt %, or about 20 wt % to about 30 wt %, or about 25 wt % to about 50 wt %) of the CNM, based on the total weight of the CNM-g-polyamide.

Polyamides may be grafted on surfaces of the CNMs by polycondensation reactions, interfacial polymerization, or in situ ring-opening polymerization (ROP) with lactams, to produce CNM-g-polyamide, as described in further detail herein.

For example, CNMs may be an amino-functionalized CNMs comprising one or more primary amine (e.g., CNM- NH$_2$) and/or one or more secondary amine (e.g., CNM-NRH wherein R is a C$_1$-C$_{20}$ alkyl group, such as methyl, ethyl, propyl, butyl, pentyl, hexyl, heptyl, octyl, nonyl, decyl, and isomers thereof, a C$_1$-C$_{20}$ cycloalkyl group, C$_1$-C$_{20}$ arylalkyl group), a carboxylic acid functionalized CNMs (e.g., CNM-COOH), amino acid functionalized CNMs (e.g., NH$_2$-CNM-COOH), an acid chloride functionalized CNMs (e.g., CNM-COCl), and the like, and any combination thereof. These functional groups may act as handles to either directly attach a polyamide to the CNM or to polymerize a polyamide from the handle where the resultant polymer is grafted to the CNM.

For example, functionalization of CNMs with carboxylic acid moieties may be carried out in presence of sulfuric acid, nitric acid, chlorate or ammonium persulfate oxidation. Alternately, functionalization of CNMs may be carried out by direct sulfonation, metalation, electrophilic addition to the deoxygenated surfaces of CNTs.

In another example, CNMs may be graphene oxide prepared from natural graphite via modified Hummers method and further functionalized into a carboxylic acid modified graphite oxide (GO—COOH) or an amino modified graphite oxide (GO-NH$_2$), for example. The carboxylic acid functionalized CNMs (e.g., carboxylic acid modified graphite oxide (GO—COOH)) may be conjugated with diamine monomers and/or dicarboxylic acid monomers via condensation reaction. CNM-g-polyamide may be formed via condensation reaction between diamine functionalized graphene oxide and dicarboxylic acid monomer. Suitable examples of diamines may include, but not limited to, ethylenediamine, 1,6-diaminohexane, p-phenylenediamine, propylamine, or butylamine.

In yet another example, the CNM-g-polyamide may be polyamide containing fullerene produced from a covalent reaction between functional polymers and fullerenes, or synthesizing polymers in the presence of fullerenes, wherein polymeric fullerenes may be prepared by: side-chain polymers, main-chain polymers, dendritic fullerenes, star-shaped polymers, fullerene end-capped polymers, and the like. Herein, functionalized CNMs may be amino-functionalized C$_{60}$-based fullerenes, carboxamide-functionalized C$_{60}$-based fullerenes, for example. Fullerene-g-polyamide may be formed under mild conditions at room temperature, by reacting amino-functionalized C$_{60}$-based fullerenes with acid chloride functionalized polyamides, to form an amide bond between the C$_{60}$-primary and/or secondary amine.

In another nonlimiting example, the CNM-g-polyamide may be polyamide containing fullerene produced from polymer-bound C$_{60}$ using soluble amino polymers (e.g., NH$_2$ group from polyamide end groups or a monomer comprising branched amino group) capable of adding to fullerene double bonds. CNM-g-polyamide (e.g., C$_{60}$-g-polyamide) may be obtained by allowing the amino polymers to react with C$_{60}$ under mild conditions at room temperature. This method can be expanded to polyamides with incorporation of 1,2,3-propanetriamine as an added monomer to polyamide design so that C$_{60}$ can be covalently bonded to the polymer or else commodity polyamides such as PA6, PA11 or PA12 can be used for an end-capped reaction (—NH$_2$ end groups on PA), for example.

Examples of polyamides include, but are not limited to, polycaproamide (nylon 6, polyamide 6, or PA6), poly(hexamethylene succinamide) (nylon 4,6, polyamide 4,6, or PA4,6), polyhexamethylene adipamide (nylon 6,6, polyamide 6,6, or PA6,6), polypentamethylene adipamide (nylon 5,6, polyamide 5,6, or PA5,6), polyhexamethylene sebacamide (nylon 6,10, polyamide 6,10, or PA6,10), polyundecamide (nylon 11, polyamide 11, or PA11), polydodecamide (nylon 12, polyamide 12, or PA12), and polyhexamethylene terephthalamide (nylon 6T, polyamide 6T, or PA6T), nylon 10,10 (polyamide 10,10 or PA10,10), nylon 10,12 (polyamide 10,12 or PA10,12), nylon 10,14 (polyamide 10,14 or PA10,14), nylon 10,18 (polyamide 10,18 or PA10,18), nylon 6,18 (polyamide 6,18 or PA6,18), nylon 6,12 (polyamide 6,12 or PA6,12), nylon 6,14 (polyamide 6,14 or PA6,14), nylon 12,12 (polyamide 12,12 or PA12,12), and the like, and any combination thereof. Copolyamides may also be used. Examples of copolyamides include, but are not limited to, PA 11/10,10, PA 6/11, PA 6,6/6, PA 11/12, PA 10,10/10,12, PA 10,10/10,14, PA 11/10,36, PA 11/6,36, PA 10,10/10,36, PA 6T/6,6, and the like, and any combination thereof. A polyamide followed by a first number comma second number is a polyamide having the first number of backbone carbons between the nitrogens for the section having no pendent =O and the second number of backbone carbons being between the two nitrogens for the section having the pendent =O. By way of nonlimiting example, nylon 6,10 is [NH—(CH$_2$)$_6$—NH—CO—(CH$_2$)$_8$—CO]$_n$. A polyamide followed by number(s) backslash number(s) are a copolymer of the polyamides indicated by the numbers before and after the backslash.

Polycondensation reactions may be performed in the presence of (a) one or more polyamine monomers and one or more polyacid monomers, (b) one or more amino acid monomers, (c) one or more polyamine monomers and one or more amino acid monomers, (d) one or more polyacid monomers and one or more amino acid monomers, or (e) one or more polyamine monomers, one or more polyacid monomers, and one or more amino acid monomers. In some instances, at least one of any of said monomers may include at least one unsaturated, aliphatic carbon-carbon bond. As described above, functional groups on a CNM may be used as handles that participate in the polycondensation reaction such that the resultant polyamide is grafted to the CNM at said functional group.

Examples of amino acid polyamide monomers suitable for use in polycondensations include, but are not limited to, HN—(CH$_2$)$_n$—COOH where n is 1-20; branched aliphatic amino acids (e.g., C$_4$-C$_{20}$); cyclic-aliphatic amino acids (e.g., C$_4$-C$_{20}$); aromatic amino acids (e.g., 3-aminobenzoic acid, 4-aminobenzoic acid); and the like; and any combination thereof. Examples of amino acid polyamide monomers not having at least one unsaturated, aliphatic carbon-carbon bond suitable for use in polycondensations include, but are not limited to, HN—(CH$_2$)$_n$—COOH where n is 1-20; branched aliphatic amino acids (e.g., C$_4$-C$_{20}$); cyclic-aliphatic amino acids (e.g., C$_4$-C$_{20}$); aromatic amino acids (e.g., 3-aminobenzoic acid, 4-aminobenzoic acid); and the like; and any combination thereof. Examples of amino acid polyamide monomers having at least one unsaturated, aliphatic carbon-carbon bond include, but are not limited to, maleamic acid; N-propylmaleamic acid; and the like; and any combination thereof.

Examples of polyacid polyamide monomers suitable for use in polycondensations include, but are not limited to, HOOC—(CH$_2$)$_n$—COOH where n is 1-20 (e.g., adipic acid, terephthalic acid, isophthalic acid, pimelic acid, suberic acid, decanedioic acid, dodecanedioic acid); isophthalic acid; terephthalic acid; pent-2-enedioic acid; dodec-2-enedioic acid; succinic acid; glutaric acid; adipic acid; pimelic acid; suberic acid; azeleic acid; sebacic acid; undecanedioic acid; dodecanedioic acid; 1,3-cyclohexanedicarboxylic acid; and the like; and any combination thereof. Examples of polyacid polyamide monomers not having at least one unsaturated, aliphatic carbon-carbon bond suitable for use in polycondensations include, but are not limited to, HOOC—$(CH_2)_n$—COOH where n is 1-20 (e.g., adipic acid, terephthalic acid, isophthalic acid, pimelic acid, suberic acid, decanedioic acid, dodecanedioic acid); isophthalic acid; terephthalic acid; pent-2-enedioic acid; dodec-2-enedioic acid; succinic acid; glutaric acid; adipic acid; pimelic acid; suberic acid; azeleic acid; sebacic acid; undecanedioic acid; dodecanedioic acid; 1,3-cyclohexanedicarboxylic acid; and the like; and any combination thereof. Examples of polyacid polyamide monomers having at least one unsaturated, aliphatic carbon-carbon bond include, but are not limited to, fumaric acid; maleic acid; glutaconic acid; aconitic acid; itaconic acid; and the like; and any combination thereof.

Examples of polyamine polyamide monomers suitable for use in polycondensations include, but are not limited to, HN—$(CH_2)_n$—NH where n is 1-20; 1,5-diamino-2-methylpentane; 1,2-diaminopropane; trimethylhexamethylenediamine; 2-methyloctane-1,8-diamine; n-methyl 1,6-hexamethylene diamine where n is 2 or 3; n-methyl 1,7-heptamethylene diamine where n is 2-4; n-methyl 1,8-octamethylene diamine where n is 2-4; n-methyl 1,12-dodecamethylene diamine where n is 2-6; 1,3-bis(aminomethyl)benzene; ortho-phenylene-bis(methylamine); 1,4-bis(aminomethyl)benzene; 1,4-cyclohexanediamine; 4-methylcyclohexane-1,3-diamine; 4-methylcyclohexane-1,3-diamine; diphenylethylenediamine; 1,3-bis(aminomethyl)cyclohexane; 4,4'-methylenebis(cyclohexylamine); 4,4'-biphenyldiamine; 1,8-diaminonaphthalene; and the like; and any combination thereof. Examples of polyamine polyamide monomers not having at least one unsaturated, aliphatic carbon-carbon bond suitable for use in polycondensations include, but are not limited to, HN—$(CH_2)_n$—NH where n is 1-20; 1,5-diamino-2-methylpentane; 1,2-diaminopropane; trimethylhexamethylenediamine; 2-methyloctane-1,8-diamine; n-methyl 1,6-hexamethylene diamine where n is 2 or 3; n-methyl 1,7-heptamethylene diamine where n is 2-4; n-methyl 1,8-octamethylene diamine where n is 2-4; n-methyl 1,12-dodecamethylene diamine where n is 2-6; 1,3-bis(aminomethyl)benzene; ortho-phenylene-bis(methylamine); 1,4-bis(aminomethyl)benzene; 1,4-cyclohexanediamine; 4-methylcyclohexane-1,3-diamine; 4-methylcyclohexane-1,3-diamine; diphenylethylenediamine; 1,3-bis(aminomethyl)cyclohexane; 4,4'-methylenebis(cyclohexylamine); 4,4'-biphenyldiamine; 1,8-diaminonaphthalene; and the like; and any combination thereof. Examples of polyamine polyamide monomers having at least one unsaturated, aliphatic carbon-carbon bond include, but are not limited to, 1,4-diamino-2-butene; 1,5-bis(3-aminophenyl)-1,4-pentadiene-3-one (DADBA); trans-4-cyclohexene-1,2-diamine; and the like; and any combination thereof.

Polycondensation reactions may be performed in the presence of an activator and/or metal salts. Examples of activators include, but are not limited to, triphenyl phosphine; and the like; and any combination thereof. Examples of metal salts include, but are not limited to, calcium chloride; cesium fluoride; and the like; and any combination thereof.

Polycondensation reactions may be performed at about 50° C. to about 200° C. (or about 50° C. to about 100° C., or about 75° C. to about 150° C., or about 125° C. to about 200° C.).

Polycondensation reactions may be performed for about 5 minutes to about 24 hours (or about 5 minutes to about 6 hours, or about 2 hours to about 12 hours, or about 6 hours to about 24 hours).

Polycondensation reactions may be performed in a solvent that includes, but is not limited to, N-methyl pyrrolidone (NMP), pyridine, dichloromethane, dimethyl sulfoxide (DMSO), N,N-dimethylformamide, acetonitrile, tetrahydrofuran, and the like, and any combination thereof.

Polycondensation reactions may be performed with a molar ratio of polyamide monomers to CNM of about 500:1 to about 1:500 (or about 500:1 to about 100:1, or about 250:1 to about 50:1, or about 100:1 to about 10:1, or about 50:1 to about 1:1, or about 25:1 to about 1:25, or about 1:1 to about 1:50, or about 1:10 to about 1:100, or about 1:50 to about 1:250, or about 1:100 to about 1:500). In some cases, the polycondensation reactions may be performed with a molar ratio of polyamide monomers to CNM of about 100:1 to about 0.5:1, or about 50:1 to about 5:1, or about 20:1 to about 10:1.

In another nonlimiting example, polyamides of the present disclosure may be grafted via ring-opening polymerization (ROP), such as in situ anionic ring-opening polymerization (AROP) of CNMs. The said CNMs may be covalently functionalized with copolymers (e.g., styrene maleic anhydride). Herein, AROP may be carried out at a temperature ranging from about 50° C. to about 150° C., and/or at a reaction time of about 60 min or less, such as about 40 min or less, such as about 20 min or less, such as from 5 min to 60 min, thus by using an initiator (e.g., caprolactam magnesium bromide) in combination with an activator. Examples of activators may include, but are not limited to, dicarbamoylcaprolactam (e.g., difunctional hexamethylene-1,6-dicarbamoylcaprolactam); and the like.

Examples of cyclic polyamide monomers suitable for use in ring-opening polymerization include, but are not limited to, azeridinone, 2-azetidinone, 2-pyrrolidinone, 2-piperidinone, ε-caprolactam, 2-azacyclooctanone, 2-azacyclononanone, 2-azacyclodecanone, 2-azacycloundecanone, 2-aza-cyclododecanone, laurolactam, butyrolactam, pivalolactam, ε-caprolactam, caprylolactam, enantholactam, undecanonelactam, laurolactam (dodecanolactam), caprolactam magnesium bromide, and the like, and any combination thereof.

Ring-opening polymerization reactions may be performed in the presence of an activator and/or metal salts. Examples of activators include, but are not limited to, triphenyl phosphine, or hexamethylene-1,6-dicarbamoylcaprolactam; and the like; and any combination thereof. Examples of metal salts include, but are not limited to, calcium chloride; cesium fluoride; and the like; and any combination thereof.

Ring-opening polymerization reactions may be performed at room temperature to about 200° C. (or room temperature to about 150° C., or about 50° C. to about 100° C., or about 75° C. to about 150° C., or about 125° C. to about 200° C.).

Ring-opening polymerization reactions may be performed for about 5 minutes to about 24 hours (or about 5 minutes about 6 hours, or about 2 hours to about 12 hours, or about 6 hours to about 24 hours).

Ring-opening polymerization reactions may be performed in a solvent that includes, but is not limited to, N-methyl pyrrolidone (NMP), pyridine, dichloromethane, dimethyl sulfoxide (DMSO), N,N-dimethylformamide, acetonitrile, tetrahydrofuran, and the like, and any combination thereof.

Ring-opening polymerization reactions may be performed with a molar ratio of polyamide monomers to CNM of about 500:1 to about 1:500 (or about 500:1 to about 100:1, or about 250:1 to about 50:1, or about 100:1 to about 10:1, or about 50:1 to about 1:1, or about 25:1 to about 1:25, or about 1:1 to about 1:50, or about 1:10 to about 1:100, or about 1:50 to about 1:250, or about 1:100 to about 1:500). In some cases, the polycondensation reactions may be performed with a molar ratio of polyamide monomers to CNM of about 100:1 to about 0.5:1, or about 50:1 to about 5:1, or about 20:1 to about 10:1. The more polyamide monomers having at least one unsaturated, aliphatic carbon-carbon bond included in the polycondensation reaction, the more locations for possible crosslinking.

The CNM-g-polyamide of the present disclosure may be produced via interfacial polymerization, wherein the polymerization process occurs at the interface between two immiscible phases (e.g., the CNM and the polyamide) resulting in a polymer that is constrained to the interface. CNM-g-polyamide composites comprising polyamides (e.g., nylon 6,6) grafted to CNMs (e.g., MWCNT) may be produced from polyamides (e.g., nylon 6,6) and acyl chloride grafted CNMs "CNMs-COCl" (e.g., acyl chloride grafted MWCNT "MWCNT-COCl") by reactive extrusion. CNMs-COCl may be produced by reacting acid treated_CNMs with thionyl chloride. Formation of CNM-g-polyamide (e.g., nylon 6,6-g-MWCNT) by reactive extrusion may be analysed/confirmed by Fourier transform infrared spectroscopy, X-ray photoelectron spectroscopy, thermogravimetric analysis, and scanning electron microscopy. To quantify the interfacial adhesion energies of the polyamide (e.g., nylon 6,6) and pristine and functionalized CNMs (e.g., pristine and functionalized MWCNTs), the contact angles of cylindrical drop-on-fiber systems may be determined by using the generalized droplet shape analysis. In at least one embodiment, the interfacial adhesion energy of the polyamide/CNM-g-polyamide (e.g., nylon 6,6/nylon 6,6-g-MWCNT composite) is greater than that of the polyamide/pristine CNM-g-polyamide (e.g., nylon 6,6/pristine MWCNT composite). The CNM-g-polyamides (e.g., Nylon 6,6-g-MWCNTs) exhibit excellent dispersion in the composite, whereas pristine CNM-g-polyamides (e.g., pristine MWCNTs) exhibit poor dispersion when composite films are prepared by solvent casting. The reinforcement level of the composite increase with increasing CNMs content (e.g., MWCNT content).

CNM-g-Polyamide Particles and Methods of Making

CNM-g-polyamides of the present disclosure may be used for producing spherical microparticles, pellets, or filaments. The spherical microparticles (or powder) comprising CNM-g-polyamides of the present disclosure may be used in a three-dimensional (3D) printing technique by selective laser sintering (SLS), whereas the filaments or pellets comprising CNM-g-polyamides of the present disclosure may be used in a three-dimensional (3D) printing technique by fused filament fabrication (FFF).

The methods and compositions described herein relate to highly spherical polymer particles that comprise CNM-g-polyamide. Without being limited by theory, it is believed that having the polyamide grafted to the CNM aids in a more homogeneous distribution of the CNM in the polymer particles, which results in a more homogeneous distribution in objects (or portions thereof) produced by additive manufacturing methods using said polymer particles.

The present disclosure also relates to methods that comprise: mixing a mixture comprising: (a) a CNM-g-polyamide, (b) a carrier fluid that is immiscible with the polyamide of the CNM-g-polyamide, optionally (c) a thermoplastic polymer (which may or may not be the polyamide of the CNM-g-polyamide) that is not the polyamide and is not grafted to a CNM, and optionally (d) an emulsion stabilizer at a temperature greater than a melting point or softening temperature of the polyamide of the CNM-g-polyamide and at a shear rate sufficiently high to disperse the CNM-g-polyamide in the carrier fluid; cooling the mixture to below the melting point or softening temperature of the polyamide to form spherical polymer particles; and separating the spherical polymer particles from the carrier fluid.

FIG. 1 is a flow chart of a nonlimiting example method 100 of the present disclosure. CNM-g-polyamide 102, carrier fluid 104, optionally emulsion stabilizer 106, and optionally thermoplastic polymer not grafted to a CNM 108 (e.g., the polyamide of the CNM-g-polyamide 102, a polyamide not of the CNM-g-polyamide 102, another thermoplastic polymer, or any combination thereof) are combined 110 to produce a mixture 112. The components 102, 104, 106, and 108 can be added individually or in a blend of components in any order and include mixing and/or heating during the process of combining 110 the components 102, 104, 106, and 108. For example, the CNM-g-polyamide 102 and the thermoplastic polymer not grafted to a CNM 108, if included, may be premixed before combining 110. Herein, the polyamide of the CNM-g-polyamide refers to the polyamide if not grafted to a CNM.

The mixture 112 is then processed 114 by applying sufficiently high shear to the mixture 112 at a temperature greater than the melting point or softening temperature of (a) the polyamide of the CNM-g-polyamide 102 or (b) thermoplastic polymer not grafted to a CNM 108, whichever is greater to form a melt emulsion 116. Because the temperature is above the melting point or softening temperature of polymeric portions of the mixture 112 (i.e., the polyamide of the CNM-g-polyamide 102 and, if included, thermoplastic polymer not grafted to a CNM 108), a polymer melt forms that comprises the CNM-g-polyamide 102 and, if included, thermoplastic polymer not grafted to a CNM 108. The shear rate should be sufficient enough to disperse the polymer melt (e.g., comprising the CNM-g-polyamide) in the carrier fluid 104 as droplets (i.e., the polymer emulsion 116). Without being limited by theory, it is believed that, all other factors being the same, increasing shear should decrease the size of the droplets of the polymer melt in the carrier fluid 104. However, at some point there may be diminishing returns on increasing shear and decreasing droplet size or there may be disruptions to the droplet contents that decrease the quality of particles produced therefrom.

The melt emulsion 116 inside and/or outside the mixing vessel is then cooled 118 to solidify the polymer droplets into CNM-g-polyamide particles 124. The term "CNM-g-polyamide particles" refers to polymer particles comprising the CNM-g-polyamide 102 and may include other components in the polymer particles (e.g., the thermoplastic polymer not grafted to a CNM 108).

The cooled mixture 120 can then be treated 122 to isolate the CNM-g-polyamide particles 124 from other components 126 (e.g., the carrier fluid 104, excess emulsion stabilizer 106, and the like) and wash or otherwise purify the CNM-g-polyamide particles 124. The CNM-g-polyamide particles 124 comprise the CNM-g-polyamide 102 and the thermoplastic polymer not grafted to a CNM 108, when included, and at least a portion of the emulsion stabilizer 106, when included, coating the outer surface of the CNM-g-polyamide particles 124. Emulsion stabilizers 106, or a portion thereof, may be deposited as coating, perhaps a uniform coating, on the CNM-g-polyamide particles 124. In some instances, which may be dependent upon non-limiting factors such as the temperature (including cooling rate), the type of CNM-g-polyamide 102, and the types and sizes of emulsion stabilizers 106, the nanoparticles of emulsion stabilizers 106 may become at least partially embedded within the outer surface of CNM-g-polyamide particles 124. Even without embedment taking place, at least a portion of the nanoparticles within emulsion stabilizers 106 may remain robustly associated with CNM-g-polyamide particles 124 to facilitate their further use. In contrast, dry blending already formed polymer particulates (e.g., formed by cryogenic grinding or precipitation processes) with a flow aid like silica nanoparticles does not result in a robust, uniform coating of the flow aid upon the polymer particulates.

The CNM-g-polyamide particles 124 may optionally be further purified 128 (described in more detail below) to yield purified CNM-g-polyamide particles 130.

The carrier fluid 104 should be chosen such that at the various processing temperatures (e.g., from room temperature to process temperature) the CNM-g-polyamide 102 and the carrier fluid 104 are immiscible. An additional factor that may be considered is the differences in (e.g., a difference or a ratio of) viscosity at process temperature between the CNM-g-polyamide 102 and the carrier fluid 104. The differences in viscosity may affect droplet breakup and particle size distribution. Without being limited by theory, it is believed that when the viscosities of the CNM-g-polyamide 102 and the carrier fluid 104 are too similar, the circularity of the product as a whole may be reduced where the particles are more ovular and more elongated structures are observed.

The CNM-g-polyamide 102 may be present in the mixture 112 at about 5 wt % to about 60 wt % (or about 5 wt % to about 25 wt %, or about 10 wt % to about 30 wt %, or about 20 wt % to about 45 wt %, or about 25 wt % to about 50 wt %, or about 40 wt % to about 60 wt %) of the CNM-g-polyamide 102, the thermoplastic polymers not grafted to a CNM 108, and the carrier fluid 104 combined. When the thermoplastic polymers not grafted to a CNM 108 is included, CNM-g-polyamide 102 and the thermoplastic polymers not grafted to a CNM 108 combined may be present in the mixture 112 at about 5 wt % to about 60 wt % (or about 5 wt % to about 25 wt %, or about 10 wt % to about 30 wt %, or about 20 wt % to about 45 wt %, or about 25 wt % to about 50 wt %, or about 40 wt % to about 60 wt %) of the CNM-g-polyamide 102, the thermoplastic polymers not grafted to a CNM 108, and the carrier fluid 104 combined. When include, the weight ratio of the CNM-g-polyamide 102 to the thermoplastic polymers not grafted to a CNM 108 may be about 10:90 to about 99:1 (or about 10:90 to about 50:50, or about 25:75 to about 75:25, or about 50:50 to about 99:1, or about 80:20 to about 99:1).

Thermoplastic polymers not grafted to a CNM 108 may be functionalized non-polar polymers. The immiscibility of polyamides/non-polar polymers (PA/NPP) heterogeneous blends (e.g., PA/PE heterogeneous blends) may be the introduction of a small number of polar groups (e.g., maleic anhydride, vinyl acetate, (meth)acrylic acid, or (meth) acrylic esters) in the backbone of the polyolefins. Another way to improve the compatibility of polyamides/non-polar polymers (PA/NPP) heterogeneous blends (e.g., PA/PE heterogeneous blends) may be to graft polar groups on the non-polar polymer chains (e.g., PE chains).

Examples of thermoplastic polymers not grafted to a CNM 108 may include, but are not limited to, polyamides, polyurethanes, polyethylenes (preferably functionalized polyethylenes), polypropylenes (preferably functionalized polypropylenes), polyacetals (may be in presence of polyethylene glycol), polycarbonates (may be in presence of compatibilisers such as maleated polyalkene (maleated PP or EPR), polyesteramide, acrylonitrile butadiene styrene (ABS) and maleated ABS (MA-g-ABS), butadiene-styrene-acrylonitrile-acrylate copolymer, styrene maleic anhydride (SMA), styrene-propylene ethylene-butylene-styrene (SEBS) and MA-g-SEBS, polyethyloxazoline, ethylene-glycidyl methacrylate graft copolymer, for example), polybutylene terephthalate (PBT), polyethylene terephthalate (PET), polyethylene naphthalate (PEN), polytrimethylene terephthalate (PTT), ethylene vinyl acetate copolymer (EVA), ethylene propylene diene rubber (EPDM), ethylene celastomer (EPR) (may be in presence of compatibilisers such as ethylene-propylene copolymers grafted with MA, for example), poly(4-methyl-1-pentene), polyhexamethylene terephthalate, polystyrenes (e.g., statistical or block styrene copolymers, graft styrenes, or compatibilizing groups, for example), polyvinyl chlorides, polytetrafluoroethenes, polyesters (e.g., polylactic acid), polyethers, polyether sulfones (PESU), polysulfones (PSU) (preferably functionalized PSU), polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), grafted or ungrafted thermoplastic polyamides, functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth)acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadiene-block-poly(methyl methacrylate) (SBM) block terpolymers, chlorinated or chlorosulphonated polyethylenes, polyvinylidene fluoride (PVDF) (may be under compatibilization using polyetheramide block copolymers), phenolic resins, poly(ethylene/vinyl acetate), polybutadienes, polyisoprenes, styrenic block copolymers, polyacrylonitriles, silicones, and the like, and any combination thereof. Copolymers comprising one or more of the foregoing may also be used in the methods and systems of the present disclosure.

The thermoplastic polymers not grafted to a CNM 108 in the compositions and methods of the present disclosure may be elastomeric or non-elastomeric. Some of the foregoing examples of thermoplastic polymers may be elastomeric or non-elastomeric depending on the exact composition of the polymer. For example, polyethylene that is a copolymer of ethylene and propylene may be elastomeric or not depending on the amount of propylene in the polymer.

Thermoplastic elastomers generally fall within one of six classes: styrenic block copolymers, thermoplastic polyolefin elastomers, thermoplastic vulcanizates (also referred to as elastomeric alloys), thermoplastic polyurethanes, thermoplastic copolyesters, and thermoplastic polyamides (typically block copolymers comprising polyamide). Examples of thermoplastic elastomers can be found in Handbook of Thermoplastic Elastomers, 2nd ed., B. M. Walker and C. P. Rader, eds., Van Nostrand Reinhold, New York, 1988. Examples of thermoplastic elastomers include, but are not limited to, elastomeric polyamides, polyurethanes, copolymers comprising a polyether block and a polyamide block (PEBA or polyether block amide), methyl methacrylate-butadiene-styrene (MBS)-type core-shell polymers, polystyrene-block-polybutadiene-block-poly(methyl methacrylate) (SBM) block terpolymers, polybutadienes, polyisoprenes, styrenic block copolymers, and polyacrylonitriles), silicones, and the like. Elastomeric styrenic block copolymers may include at least one block selected from the group of:

isoprene, isobutylene, butylene, ethylene/butylene, ethylene-propylene, and ethylene-ethylene/propylene. More specific elastomeric styrenic block copolymer examples include, but are not limited to, poly(styrene-ethylene/butylene), poly(styrene-ethylene/butylene-styrene), poly(styrene-ethylene/propylene), styrene-ethylene/propylene-styrene), poly(styrene-ethylene/propylene-styrene-ethylene-propylene), poly(styrene-butadiene-styrene), poly(styrene-butylene-butadiene-styrene), and the like, and any combination thereof. Without being bond by any theory, thermoplastic elastomers (e.g., butyl rubber) with use of a compatibilizer such as ethylene-methacrylic acid-isobutyl acrylate copolymer can improve the interfacial adhesion between the two phases and the dispersion of the thermoplastic elastomers domains in a PA matrix.

Examples of polyurethanes include, but are not limited to, polyether polyurethanes, polyester polyurethanes, mixed polyether and polyester polyurethanes, and the like, and any combination thereof. Examples of thermoplastic polyurethanes include, but are not limited to, poly[4,4'-methylenebis(phenylisocyanate)-alt-1,4-butanediol/di(propylene glycol)/polycaprolactone], ELASTOLLAN® 1190A (a polyether polyurethane elastomer, available from BASF), ELASTOLLAN® 1190A10 (a polyether polyurethane elastomer, available from BASF), and the like, and any combination thereof.

Compatibilizers may optionally be used to improve the blending efficiency and efficacy of the CNM-g-polyamide 102 with one or more thermoplastic polymers. Examples of polymer compatibilizers include, but not limited to, PROPOLDER™ MPP2020 20 (polypropylene, available from Polygroup Inc.), PROPOLDER™ MPP2040 40 (polypropylene, available from Polygroup Inc.), NOVACOM™ HFS2100 (maleic anhydride functionalized high density polyethylene polymer, available from Polygroup Inc.), KEN-REACT™ CAPS™ LT$^M$ 12/L (organometallic coupling agent, available from Kenrich Petrochemicals), KEN-REACT™ CAPOW™ L™ 12/H (organometallic coupling agent, available from Kenrich Petrochemicals), KEN-REACT™ LICA™ 12 (organometallic coupling agent, available from Kenrich Petrochemicals), KEN-REACT™ CAPS™ KPR™ 12/LV (organometallic coupling agent, available from Kenrich Petrochemicals), KEN-REACT™ CAPOW™ KPR™ 12/H (organometallic coupling agent, available from Kenrich Petrochemicals), KEN-REACT™ titanates & zirconates (organometallic coupling agent, available from Kenrich Petrochemicals), VISTAMAXX™ (ethylene-propylene copolymers, available from ExxonMobil), SANTOPRENE™ (thermoplastic vulcanizate of ethylene-propylene-diene rubber and polypropylene, available from ExxonMobil), VISTALON™ (ethylene-propylene-diene rubber, available from ExxonMobil), EXACT™ (plastomers, available from ExxonMobil) EXXELOR™ (polymer resin, available from ExxonMobil), FUSABOND™ M603 (random ethylene copolymer, available from Dow), FUSABOND™ E226 (anhydride modified polyethylene, available from Dow), BYNEL™ 41E710 (coextrudable adhesive resin, available from Dow), SURLYN™ 1650 (ionomer resin, available from Dow), FUSABOND™ P353 (a chemically modified polypropylene copolymer, available from Dow), ELVALOY™ PTW (ethylene terpolymer, available from Dow), ELVALOY™ 3427AC (a copolymer of ethylene and butyl acrylate, available from Dow), LOTADER™ AX8840 (ethylene acrylate-based terpolymer, available from Arkema), LOTADER™ 3210 (ethylene acrylate-based terpolymer, available from Arkema), LOTADER™ 3410 (ethylene acrylate-based terpolymer, available from Arkema), LOTADER™ 3430 (ethylene acrylate-based terpolymer, available from Arkema), LOTADER™ 4700 (ethylene acrylate-based terpolymer, available from Arkema), LOTADER™ AX8900 (ethylene acrylate-based terpolymer, available from Arkema), LOTADER™ 4720 (ethylene acrylate-based terpolymer, available from Arkema), BAXXODUR™ EC 301 (amine for epoxy, available from BASF), BAXXODUR™ EC 311 (amine for epoxy, available from BASF), BAXXODUR™ EC 303 (amine for epoxy, available from BASF), BAXXODUR™ EC 280 (amine for epoxy, available from BASF), BAXXODUR™ EC 201 (amine for epoxy, available from BASF), BAXXODUR™ EC 130 (amine for epoxy, available from BASF), BAXXODUR™ EC 110 (amine for epoxy, available from BASF), styrenics, polypropylene, polyamides, polycarbonate, EASTMAN™ G-3003 (a maleic anhydride grafted polypropylene, available from Eastman), RETAIN™ (polymer modifier available from Dow), AMPLIFY TY™ (maleic anhydride grafted polymer, available from Dow), INTUNE™ (olefin block copolymer, available from Dow), and the like and any combination thereof.

The polyamide of the CNM-g-polyamide 102 and/or the thermoplastic polymer not grafted to a CNM 108 may have a melting point or softening temperature of about 50° C. to about 450° C. (or about 50° C. to about 125° C., or about 100° C. to about 175° C., or about 150° C. to about 280° C., or about 200° C. to about 350° C., or about 300° C. to about 450° C.).

The polyamide of the CNM-g-polyamide 102 and/or the thermoplastic polymer not grafted to a CNM 108 may have a glass transition temperature (ASTM E1356-08(2014) with 10° C./min ramping and cooling rates) of about −50° C. to about 400° C. (or about −50° C. to about 0° C., or about −25° C. to about 50° C., or about 0° C. to about 150° C., or about 100° C. to about 250° C., or about 150° C. to about 300° C., or about 200° C. to about 400° C.).

The thermoplastic polymer not grafted to a CNM 108 may optionally comprise an additive. Typically, the additive would be present before addition of the thermoplastic polymers to the mixture. Therefore, in the polymer melt droplets and resultant CNM-g-polyamide particles 124/130, the additive is dispersed throughout the thermoplastic polymer. Accordingly, for clarity, this additive is referred to herein as an "internal additive." The internal additive may be blended with the thermoplastic polymer just prior to making the mixture or well in advance.

When describing component amounts in the compositions described herein (e.g., the mixture 112 and the CNM-g-polyamide particles 124), a weight percent based on the thermoplastic polymer not inclusive of the internal additive. For example, a composition comprising 1 wt % of emulsion stabilizer 106 by weight of 100 g of a thermoplastic polymer comprising 10 wt % internal additive and 90 wt % thermoplastic polymer is a composition comprising 0.9 g of emulsion stabilizer 106, 90 g of thermoplastic polymer, and 10 g of internal additive.

The present disclosure provides compositions comprising: CNM-g-polyamide particles comprising a polyamide grafted to a carbon nanomaterial. The CNM-g-polyamide particles may have an average particle size of about 10 µm to about 100 µm and have a diameter span of about 1 to about 2. The CNM-g-polyamide particles may include the CNM at about 0.05 wt % to about 50 wt % of the CNM-g-polyamide particles, and the CNM may be selected from the group consisting of a carbon nanotube, a graphite, a graphene, a fullerene, and any combinations thereof The internal additive may be present in the thermoplastic polymer at about 0.1 wt % to about 60 wt % (or about 0.1 wt % to about 5 wt %, or about 1 wt % to about 10 wt %, or about 5 wt % to about 20 wt %, or about 10 wt % to about 30 wt %, or about 25 wt % to about 50 wt %, or about 40 wt % to about 60 wt %) of the thermoplastic polymer not grafted to a CNM 108. For example, the thermoplastic polymer may comprise about 70 wt % to about 85 wt % of a thermoplastic polymer and about 15 wt % to about 30 wt % of an internal additive like glass fiber or carbon fiber.

Examples of internal additives include, but are not limited to, fillers, strengtheners, pigments, pH regulators, and the like, and combinations thereof. Examples of fillers include, but are not limited to, glass fibers, glass particles, mineral fibers, carbon fiber, oxide particles (e.g., titanium dioxide and zirconium dioxide), metal particles (e.g., aluminum powder), and the like, and any combination thereof. Examples of pigments include, but are not limited to, organic pigments, inorganic pigments, carbon black, and the like, and any combination thereof. For example, fillers used herein may include exfoliated graphite (EG), exfoliated graphite nanoplatelets (xGnP), carbon black, carbon nanofibers (CNF), carbon nanotubes (CNT), graphenes, graphene oxides, graphite oxides, graphene oxide nanosheets, fullerenes.

Suitable carrier fluids (e.g., carrier fluid 104) may have a viscosity at 25° C. of about 1,000 cSt to about 150,000 cSt (or about 1,000 cSt to about 60,000 cSt, or about 40,000 cSt to about 100,000 cSt, or about 75,000 cSt to about 150,000 cSt). For example, suitable carrier fluids (e.g., carrier fluid 104) may have a viscosity at 25° C. of about 10,000 cSt to about 60,000 cSt.

Examples of carrier fluids (e.g., carrier fluid 104) may include, but are not limited to, silicone oil, fluorinated silicone oils, perfluorinated silicone oils, polyethylene glycols, alkyl-terminal polyethylene glycols (e.g., $C_1$ to $C_4$ terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, and the like, and any combination thereof. Examples of silicone oils include, but are not limited to, polydimethylsiloxane (PDMS), methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, and the like, and any combination thereof. When the carrier fluid 104 comprises two or more of the foregoing, the carrier fluid 104 may have one or more phases. For example, polysiloxanes modified with fatty acids and polysiloxanes modified with fatty alcohols (preferably with similar chain lengths for the fatty acids and fatty alcohols) may form a single-phase carrier fluid. In another example, a carrier fluid 104 comprising a silicone oil and an alkyl-terminal polyethylene glycol may form a two-phase carrier fluid. In at least one embodiment, the carrier fluid 104 is polydimethylsiloxane (PDMS).

The carrier fluid 104 may be present in the mixture at about 40 wt % to about 95 wt % (or about 75 wt % to about 95 wt %, or about 70 wt % to about 90 wt %, or about 55 wt % to about 80 wt %, or about 50 wt % to about 75 wt %, or about 40 wt % to about 60 wt %) of the CNM-g-polyamide 102, the thermoplastic polymers not grafted to a CNM 108, and the carrier fluid 104 combined. The carrier fluid may be present at a weight ratio of the carrier fluid to a combination of the CNM-g-polyamide 102 and the thermoplastic polymer ranging from 50:50 to 90:10.

In some instances, the carrier fluid 104 may have a density of about 0.6 g/cm$^3$ to about 1.5 g/cm$^3$, and the thermoplastic polymer may have a density of about 0.7 g/cm$^3$ to about 1.7 g/cm$^3$, wherein the thermoplastic polymer may have a density similar, lower, or higher than the density of the carrier fluid 104.

The CNM should be sufficiently stable to not decompose at the processing temperatures. Examples of CNM may include, but are not limited to, carbon nanotubes, graphites, graphenes, fullerenes, carbon black; and the like; and any combination thereof.

The emulsion stabilizers (e.g., emulsion stabilizer 106) used in the methods and compositions of the present disclosure may comprise nanoparticles (e.g., oxide nanoparticles, carbon black, polymer nanoparticles, and combinations thereof), surfactants, and the like, and any combination thereof.

Oxide nanoparticles may be metal oxide nanoparticles, non-metal oxide nanoparticles, or mixtures thereof. Examples of oxide nanoparticles include, but are not limited to, silica, titania, zirconia, alumina, iron oxide, copper oxide, tin oxide, boron oxide, cerium oxide, thallium oxide, tungsten oxide, and the like, and any combination thereof. Mixed metal oxides and/or non-metal oxides, like aluminosilicates, borosilicates, and aluminoborosilicates, are also inclusive in the term metal oxide. The oxide nanoparticles may by hydrophilic or hydrophobic, which may be native to the particle or a result of surface treatment of the particle. For example, a silica nanoparticle having a hydrophobic surface treatment, like dimethyl silyl, trimethyl silyl, and the like, may be used in methods and compositions of the present disclosure. Additionally, silica with functional surface treatments like methacrylate functionalities may be used in methods and compositions of the present disclosure. Unfunctionalized oxide nanoparticles may also be suitable for use as well.

Commercially available examples of silica nanoparticles include, but are not limited to, AEROSIL® particles available from Evonik (e.g., AEROSIL® R812S (about 7 nm average diameter silica nanoparticles having a hydrophobically modified surface and a BET surface area of 260±30 m$^2$/g), AEROSIL® RX50 (about 40 nm average diameter silica nanoparticles having a hydrophobically modified surface and a BET surface area of 35±10 m$^2$/g), AEROSIL® 380 (silica nanoparticles having a hydrophilically modified surface and a BET surface area of 380±30 m$^2$/g), and the like, and any combination thereof.

Carbon black is another type of nanoparticle that may be present as an emulsion stabilizer in the compositions and methods disclosed herein. Various grades of carbon black will be familiar to one having ordinary skill in the art, any of which may be used herein. Other nanoparticles capable of absorbing infrared radiation may be used similarly.

Polymer nanoparticles are another type of nanoparticle that may be present as an emulsion stabilizer (e.g., emulsion stabilizer 106) in the disclosure herein. Suitable polymer nanoparticles may include one or more polymers that are thermosetting and/or crosslinked, such that they do not melt when processed by melt emulsification according to the disclosure herein. High molecular weight thermoplastic polymers having high melting or decomposition points may similarly comprise suitable polymer nanoparticle emulsion stabilizers.

Surfactants may be anionic, cationic, nonionic, or zwitterionic. Examples of surfactants include, but are not limited to, sodium dodecyl sulfate, sorbitan oleates, poly[dimethylsiloxane-co-[3-(2-(2-hydroxyethoxy)ethoxy)propylmethylsiloxane]], docusate sodium (sodium 1,4-bis(2-ethylhexoxy)-1,4-dioxobutane-2-sulfonate), and the like, and any combination thereof. Commercially available examples of surfactants include, but are not limited to, CALFAX® DB-45 (sodium dodecyl diphenyl oxide disulfonate, available from Pilot Chemicals), SPAN® 80 (sorbitan maleate non-ionic surfactant), MERPOL® surfactants (available from Stepan Company), TERGITOL™ TMN-6 (a water-soluble, nonionic surfactant, available from DOW), TRITON™ X-100 (octyl phenol ethoxylate, available from SigmaAldrich), IGEPAL® CA-520 (polyoxyethylene (5) isooctylphenyl ether, available from SigmaAldrich), BRIJ® S10 (polyethylene glycol octadecyl ether, available from SigmaAldrich), and the like, and any combination thereof.

Surfactants may be included in the mixture at a concentration of about 0.01 wt % to about 10 wt % (or about 0.01 wt % to about 1 wt %, or about 0.5 wt % to about 2 wt %, or about 1 wt % to about 3 wt %, or about 2 wt % to about 5 wt %, or about 5 wt % to about 10 wt %) based on the weight of the CNM-g-polyamide 102. Alternatively, the mixture may comprise no (or be absent of) surfactant.

A weight ratio of nanoparticles to surfactant in the emulsion stabilizer 106 may be about 1:10 to about 10:1 (or about 1:10 to about 1:1, or about 1:5 to about 5:1, or about 1:1 to about 10:1).

The emulsion stabilizer 106 may be included in the mixture at a concentration of about 0.01 wt % to about 10 wt % (or about 0.01 wt % to about 1 wt %, or about 0.1 wt % to about 3 wt %, or about 1 wt % to about 5 wt %, or about 5 wt % to about 10 wt %) based on the weight of the CNM-g-polyamide 102 and the thermoplastic polymers not grafted to a CNM 108 combined.

Relative to the combining 110 of FIG. 1, in some instances, the emulsion stabilizer 106 may first be dispersed in the carrier fluid 104, optionally with heating said dispersion, before adding the CNM-g-polyamide 102 and/or the thermoplastic polymers not grafted to a CNM 108. In another nonlimiting example, the CNM-g-polyamide 102 and/or the thermoplastic polymers not grafted to a CNM 108 may be heated to produce a polymer melt to which the carrier fluid 104 and emulsion stabilizer 106 are added together or in either order. In yet another nonlimiting example, the CNM-g-polyamide 102 and/or the thermoplastic polymers not grafted to a CNM 108 along with carrier fluid 104 can be mixed at a temperature greater than the necessary melting point or softening temperature described herein and at a shear rate sufficient enough to disperse the polymer melt in the carrier fluid 104. Then, the emulsion stabilizer 106 can be added to form the mixture 112 and maintained at suitable process conditions for a set period of time.

Combining the CNM-g-polyamide 102, the thermoplastic polymers not grafted to a CNM 108, the carrier fluid 104, and optionally the emulsion stabilizer 106 in any combination can occur in a mixing apparatus used for the processing and/or another suitable vessel. By way of nonlimiting example, the CNM-g-polyamide 102 and/or the thermoplastic polymers not grafted to a CNM 108 may be heated to a temperature greater than the necessary melting point or softening temperature described herein in the mixing apparatus used for the processing, and the emulsion stabilizer 106 may be dispersed in the carrier fluid 104 in another vessel. Then, said dispersion may be added to the melt in the mixing apparatus used for the processing.

The mixing apparatuses used for the processing 114 to produce the melt emulsion 116 should be capable of maintaining the melt emulsion 116 at a temperature greater than the necessary melting point or softening temperature described herein and applying a shear rate sufficient to disperse the polymer melt in the carrier fluid 104 as droplets.

Examples of mixing apparatuses used for the processing 114 to produce the melt emulsion 116 may include, but are not limited to, extruders (e.g., continuous extruders, batch extruders, and the like), stirred reactors, blenders, reactors with inline homogenizer systems, and the like, and apparatuses derived therefrom.

The processing 114 and forming the melt emulsion 116 at suitable process conditions (e.g., temperature, shear rate, and the like) for a set period of time.

The temperature of the processing 114 and forming the melt emulsion 116 should be a temperature greater than the necessary melting point or softening temperature of the described herein and less than the decomposition temperature of any components (i.e., the CNM-g-polyamide 102, the thermoplastic polymers not grafted to a CNM 108, carrier fluid 104, emulsion stabilizer 106) in the mixture 112. For example, the temperature of processing 114 and forming the melt emulsion 116 may be about 1° C. to about 50° C. (or about 1° C. to about 25° C., or about 5° C. to about 30° C., or about 20° C. to about 50° C.) greater than the melting point or softening temperature described herein provided the temperature of processing and forming the melt emulsion 116 is less than the decomposition temperature of any components (i.e., the CNM-g-polyamide 102, the thermoplastic polymers not grafted to a CNM 108, carrier fluid 104, emulsion stabilizer 106) in the mixture 112.

The shear rate of processing 114 and forming the melt emulsion 116 should be sufficiently high to disperse the polymer melt in the carrier fluid 104 as droplets. Said droplets should comprise droplets having a diameter of about 1000 μm or less (or about 1 μm to about 1000 μm, or about 1 μm to about 50 μm, or about 10 μm to about 100 μm, or about 10 μm to about 250 μm, or about 50 μm to about 500 μm, or about 250 μm to about 750 μm, or about 500 μm to about 1000 μm).

The time for maintaining said temperature and shear rate for processing 114 and forming the melt emulsion 116 may be 10 seconds to 18 hours or longer (or 10 seconds to 30 minutes, or 5 minutes to 1 hour, or 15 minutes to 2 hours, or 1 hour to 6 hours, or 3 hours to 18 hours). Without being limited by theory, it is believed that a steady state of droplet sizes will be reached at which point processing can be stopped. That time may depend on, among other things, the temperature, shear rate, the CNM-g-polyamide 102, the thermoplastic polymers not grafted to a CNM 108, the carrier fluid composition 104, and the emulsion stabilizer composition 106.

The melt emulsion 116 may then be cooled 118. Cooling 118 can be slow (e.g., allowing the melt emulsion 116 to cool 118 under ambient conditions) to fast (e.g., quenching). For example, the rate of cooling 118 may range from about 10° C./hour to about 100° C./second to almost instantaneous with quenching (for example in dry ice) (or about 10° C./hour to about 60° C./hour, or about 0.5° C./minute to about 20° C./minute, or about 1° C./minute to about 5° C./minute, or about 10° C./minute to about 60° C./minute, or about 0.5° C./second to about 10° C./second, or about 10° C./second to about 100° C./second).

During cooling, little to no shear may be applied to the melt emulsion 116. In some instances, the shear applied during heating may be applied during cooling 118.

The cooled mixture resulting from cooling 118 the melt emulsion 116 may comprise solidified CNM-g-polyamide particles 124 and other components (e.g., the carrier fluid 104, excess emulsion stabilizer 106, and the like). The solidified CNM-g-polyamide particles 124 may be dispersed in the carrier fluid 104 and/or settled in the carrier fluid 104.

The cooled mixture may then be treated to the separate CNM-g-polyamide particles 124 from the other components. Suitable treatments include, but are not limited to, washing, filtering, centrifuging, decanting, and the like, and any combination thereof.

Solvents used for washing the CNM-g-polyamide particles 124 should generally be (a) miscible with the carrier fluid 104 and (b) nonreactive (e.g., non-swelling and non-dissolving) with the CNM-g-polyamide 102 and/or the thermoplastic polymers not grafted to a CNM 108. The choice of solvent will depend on, among other things, the compositions of the carrier fluid 104, the CNM-g-polyamide 102, and the thermoplastic polymers not grafted to a CNM 108.

Examples of solvents include, but are not limited to, hydrocarbon solvents (e.g., pentane, hexane, heptane, octane, cyclohexane, cyclopentane, decane, dodecane, tridecane, and tetradecane), aromatic hydrocarbon solvents (e.g., benzene, toluene, xylene, 2-methyl naphthalene, and cresol), ether solvents (e.g., diethyl ether, tetrahydrofuran, diisopropyl ether, and dioxane), ketone solvents (e.g., acetone and methyl ethyl ketone), alcohol solvents (e.g., methanol, ethanol, isopropanol, and n-propanol), ester solvents (e.g., ethyl acetate, methyl acetate, butyl acetate, butyl propionate, and butyl butyrate), halogenated solvents (e.g., chloroform, bromoform, 1,2-dichloromethane, 1,2-dichloroethane, carbon tetrachloride, chlorobenzene, and hexafluoroisopropanol), water, and the like, and any combination thereof.

Solvent may be removed from the CNM-g-polyamide particles 124 by drying using an appropriate method such as air-drying, heat-drying, reduced pressure drying, freeze drying, or a hybrid thereof. The heating may be performed preferably at a temperature lower than the glass transition point of the polyamide of CNM-g-polyamide 102 and the thermoplastic polymers not grafted to a CNM 108, when included, (e.g., about 50° C. to about 150° C.).

Advantageously, carrier fluids (e.g., carrier fluid 104) and washing solvents of the systems and methods described herein can be recycled and reused. One skilled in the art will recognize any necessary cleaning of used carrier fluid 104 and solvent necessary in the recycling process.

The CNM-g-polyamide particles 124, after separation from the other components, may optionally be further purified. For example, to narrow the particle size distribution (or reduce the diameter span), the CNM-g-polyamide particles 124 can be passed through a sieve having a pore size of about 10 μm to about 250 μm (or about 10 μm to about 100 μm, or about 50 μm to about 200 μm, or about 150 μm to about 250 μm).

In another example purification technique, the CNM-g-polyamide particles 124 may be washed with water to remove surfactant while maintaining substantially all of the nanoparticles associated with the surface of the CNM-g-polyamide particles 124. In yet another example purification technique, the CNM-g-polyamide particles 124 may be blended with additives to achieve a desired final product. For clarity, because such additives are blended with the CNM-g-polyamide particles 124 described herein after the particles are solidified, such additives are referred to herein as "external additives." Examples of external additives include flow aids, other polymer particles, fillers, and the like, and any combination thereof.

In some instances, a surfactant used in making the CNM-g-polyamide particles 124 may be unwanted in downstream applications. Accordingly, yet another example purification technique may include at least substantial removal of the surfactant from the CNM-g-polyamide particles 124 (e.g., by washing and/or pyrolysis).

The CNM-g-polyamide particles 124 and/or purified CNM-g-polyamide particles 124 may be characterized by composition, physical structure, and the like.

As described above, the emulsion stabilizers (e.g., emulsion stabilizer 106) are at the interface between the polymer melt and the carrier fluid 104. As a result, when the mixture is cooled, the emulsion stabilizers (e.g., emulsion stabilizer 106) remain at, or in the vicinity of, said interface. Therefore, the structure of the CNM-g-polyamide particles 124 is, in general when emulsion stabilizers (e.g., emulsion stabilizer 106) are used, includes emulsion stabilizers (a) dispersed on an outer surface of the CNM-g-polyamide particles 124 and/or (b) embedded in an outer portion (e.g., outer 1 vol %) of the CNM-g-polyamide particles 124.

Further, where voids form inside the polymer melt droplets, emulsion stabilizers (e.g., emulsion stabilizer 106) should generally be at (and/or embedded in) the interface between the interior of the void and the CNM-g-polyamide 124 and/or thermoplastic polymer. The voids generally do not contain the CNM-g-polyamide 124 and/or thermoplastic polymer. Rather, the voids may contain, for example, carrier fluid 104, air, or be void. The CNM-g-polyamide particles 124 may comprise carrier fluid 104 at about 5 wt % or less (or about 0.001 wt % to about 5 wt %, or about 0.001 wt % to about 0.1 wt %, or about 0.01 wt % to about 0.5 wt %, or about 0.1 wt % to about 2 wt %, or about 1 wt % to about 5 wt %) of the CNM-g-polyamide particles 124.

When the thermoplastic polymers not grafted to a CNM is not included, the CNM-g-polyamide and the thermoplastic polymers not grafted to a CNM, combined, may be present in the CNM-g-polyamide particles at about 90 wt % to about 99.5 wt % (or about 90 wt % to about 95 wt %, or about 92 wt % to about 97 wt %, or about 95 wt % to about 99.5 wt %) of the CNM-g-polyamide particles. When the thermoplastic polymers not grafted to a CNM is included, the CNM-g-polyamide and the thermoplastic polymers not grafted to a CNM, combined, may be present in the CNM-g-polyamide particles at about 90 wt % to about 99.5 wt % (or about 90 wt % to about 95 wt %, or about 92 wt % to about 97 wt %, or about 95 wt % to about 99.5 wt %) of the CNM-g-polyamide particles. The weight ratio of the CNM-g-polyamide to the thermoplastic polymers not grafted to a CNM, when included, may be about 10:90 to about 99:1 (or about 10:90 to about 50:50, or about 25:75 to about 75:25, or about 50:50 to about 99:1, or about 80:20 to about 99:1).

When included, the emulsion stabilizers (e.g., emulsion stabilizer 106) may be present in the CNM-g-polyamide particles 124 at about 10 wt % or less (or about 0.01 wt % to about 10 wt %, or about 0.01 wt % to about 1 wt %, or about 0.5 wt % to about 5 wt %, or about 3 wt % to about 7 wt %, or about 5 wt % to about 10 wt %) of the CNM-g-polyamide particles 124. When purified to at least substantially remove surfactant or another emulsion stabilizer, the emulsion stabilizers may be present in the CNMg-polyamide particle 124/130 at less than 0.01 wt % (or 0 wt % to about 0.01 wt %, or 0 wt % to 0.001 wt %).

Upon forming thermoplastic particulates according to the disclosure herein using particulate emulsion stabilizers, at least a portion of the particulate emulsion stabilizers, such as silica nanoparticles, may be disposed as a coating upon the outer surface of the CNM-g-polyamide particle 124/130. At least a portion of the surfactant, if used, may be associated with the outer surface as well. The coating may be disposed substantially uniformly upon the outer surface. As used herein with respect to a coating, the term "substantially uniform" refers to even coating thickness in surface locations covered by the coating composition (e.g., nanoparticles and/or surfactant), particularly the entirety of the outer surface. The emulsion stabilizers 106 may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the CNM-g-polyamide particles. When purified to at least substantially remove surfactant or another emulsion stabilizer, the emulsion stabilizers may be present in the CNM-g-polyamide particles 124/130 at less than 25% (or 0% to about 25%, or about 0.10% to about 5%, or about 0.10% to about 10%, or about 10% to about 5%, or about 1% to about 10%, or about 5% to about 15%, or about 10% to about 25%) of the surface area of the CNM-g-polyamide particles 124/130. The coverage of the emulsion stabilizers on an outer surface of the CNM-g-polyamide particles 124/130 may be determined using image analysis of the scanning electron microscope images (SEM micrographs). The emulsion stabilizers may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the CNM-g-polyamide particles 124/130 (and coated CNM-g-polyamide particles, when produced). When purified to at least substantially remove surfactant or another emulsion stabilizer, the emulsion stabilizers may be present in the CNM-g-polyamide particles 124/130 at less than 25% (or 0% to about 25%, or about 0.10% to about 5%, or about 0.10% to about 10%, or about 10% to about 5%, or about 10% to about 10%, or about 5% to about 15%, or about 10% to about 25%) of the surface area of the CNM-g-polyamide particles 124/130. The coverage of the emulsion stabilizers on an outer surface of the CNM-g-polyamide particles may be determined using image analysis of the SEM micrographs.

The CNM-g-polyamide particles 124/130 of the present disclosure may include the carbon nanomaterial (or cumulative carbon nanomaterials if more than one is used) at about 0.01 wt % to about 50 wt % (or about 0.01 wt % to about 1 wt %, or about 0.1 wt % to about 5 wt %, or about 1 wt % to about 10 wt %, or about 5 wt % to about 20 wt %, or about 10 wt % to about 30 wt %, or about 25 wt % to about 50 wt %) of the CNM-g-polyamide particles 124/130.

The CNM-g-polyamide particles 124/130 may comprise one or more carbon nanomaterial. For example, two or more different carbon nanomaterials may be grafted to a polyamide in the same reaction and then used as CNM-g-polyamide 102 in the methods and compositions described herein. In another example, two different CNM-g-polyamides may be produced and blended before (or during) the mixing process of the melt-emulsification process described herein.

The CNM-g-polyamide particles 124/130 may have a circularity of about 0.90 to about 1.0.

The CNM-g-polyamide particles 124/130 may have a BET surface area of about 10 m$^2$/g to about 500 m$^2$/g (or about 10 m$^2$/g to about 150 m$^2$/g, or about 25 m$^2$/g to about 100 m$^2$/g, or about 100 m$^2$/g to about 250 m$^2$/g, or about 250 m$^2$/g to about 500 m$^2$/g).

The CNM-g-polyamide particles 124/130 may have a D10 of about 0.1 µm to about 125 µm (or about 0.1 µm to about 5 µm, about 1 µm to about 10 µm, about 5 µm to about 30 µm, or about 1 µm to about 25 µm, or about 25 µm to about 75 µm, or about 50 µm to about 85 µm, or about 75 µm to about 125 µm), a D50 of about 0.5 µm to about 200 µm (or about 0.5 µm to about 10 µm, or about 5 µm to about 50 µm, or about 30 µm to about 100 µm, or about 30 µm to about 70 µm, or about 25 µm to about 50 µm, or about 50 µm to about 100 µm, or about 75 µm to about 150 µm, or about 100 µm to about 200 µm), and a D90 of about 3 µm to about 300 µm (or about 3 µm to about 15 µm, or about 10 µm to about 50 µm, or about 25 µm to about 75 µm, or about 70 µm to about 200 µm, or about 60 µm to about 150 µm, or about 150 µm to about 300 µm), wherein D10<D50<D900. The CNM-g-polyamide particles 124/130 may also have a diameter span of about 0.2 to about 10 (or about 0.2 to about 0.5, or about 0.4 to about 0.8, or about 0.5 to about 1, or about 1 to about 3, or about 2 to about 5, or about 5 to about 10). Without limitation, diameter span values of 1.0 or greater are considered broad, and diameter spans values of 0.75 or less are considered narrow. Preferable, the CNM-g-polyamide particles 124/130 have a diameter span of about 0.2 to about 1.

In a first nonlimiting example, the CNM-g-polyamide particles 124/130 may have a D10 of about 0.1 µm to about 10 µm, a D50 of about 0.5 µm to about 25 µm, and a D90 of about 3 µm to about 50 µm, wherein D10<D50<D90. Said CNM-g-polyamide particles 124/130 may have a diameter span of about 0.2 to about 2.

In a second nonlimiting example, the CNM-g-polyamide particles 124/130 may have a D10 of about 5 µm to about 30 µm, a D50 of about 30 µm to about 70 µm, and a D90 of about 70 µm to about 120 µm, wherein D10<D50<D90. Said CNM-g-polyamide particles 124/130 may have a diameter span of about 1.0 to about 2.5.

In a third nonlimiting example, the CNM-g-polyamide particles 124/130 may have a D10 of about 25 µm to about 60 µm, a D50 of about 60 µm to about 110 µm, and a D90 of about 110 µm to about 175 µm, wherein D10<D50<D90. Said CNM-g-polyamide particles 124/130 may have a diameter span of about 0.6 to about 1.5.

In a fourth nonlimiting example, the CNM-g-polyamide particles 124/130 may have a D10 of about 75 µm to about 125 µm, a D50 of about 100 µm to about 200 µm, and a D90 of about 125 µm to about 300 µm, wherein D10<D50<D90. Said CNM-g-polyamide particles 124/130 may have a diameter span of about 0.2 to about 1.2.

In a fifth nonlimiting example, the CNM-g-polyamide particles 124/130 may have a D10 of about 1 µm to about 50 µm (or about 5 µm to about 30 µm, or about 1 µm to about 25 µm, or about 25 µm to about 50 µm), a D50 of about 25 µm to about 100 µm (or about 30 µm to about 100 µm, or about 30 µm to about 70 µm, or about 25 µm to about 50 µm, or about 50 µm to about 100 µm), and a D90 of about 60 µm to about 300 µm (or about 70 µm to about 200 µm, or about 60 µm to about 150 µm, or about 150 µm to about 300 µm), wherein D10<D50<D90. The CNM-g-polyamide particles 124/130 may also have a diameter span of about 0.4 to about 3 (or about 0.6 to about 2, or about 0.4 to about 1.5, or about 1 to about 3).

The CNM-g-polyamide particles 124/130 may have a circularity of about 0.9 or greater (or about 0.90 to about 1.0, or about 0.93 to about 0.99, or about 0.95 to about 0.99, or about 0.97 to about 0.99, or about 0.98 to 1.0).

The CNM-g-polyamide particles 124/130 may have an angle of repose of about 250 to about 450 (or about 250 to about 35°, or about 30° to about 40°, or about 350 to about 45°).

The CNM-g-polyamide particles 124/130 may have a Hausner ratio of about 1.0 to about 1.5 (or about 1.0 to about 1.2, or about 1.1 to about 1.3, or about 1.2 to about 1.35, or about 1.3 to about 1.5).

The CNM-g-polyamide particles 124/130 may have a bulk density of about 0.3 g/cm$^3$ to about 0.8 g/cm$^3$ (or about 0.3 g/cm$^3$ to about 0.6 g/cm$^3$, or about 0.4 g/cm$^3$ to about 0.7 g/cm$^3$, or about 0.5 g/cm$^3$ to about 0.6 g/cm$^3$, or about 0.5 g/cm$^3$ to about 0.8 g/cm$^3$).

The CNM-g-polyamide particles 124/130 may have an aerated density of about 0.5 g/cm$^3$ to about 0.8 g/cm$^3$ (or about 0.5 g/cm$^3$ to about 0.7 g/cm$^3$, or about 0.55 g/cm$^3$ to about 0.80 g/cm$^3$).

The CNM-g-polyamide particles 124/130 may have a tapped density of about 0.6 g/cm$^3$ to about 0.9 g/cm$^3$ (or about 0.60 g/cm$^3$ to about 0.75 g/cm$^3$, or about 0.65 g/cm$^3$ to about 0.80 g/cm$^3$, or about 0.70 g/cm$^3$ to about 0.90 g/cm$^3$).

Depending on the temperature and shear rate of processing and the composition and relative concentrations of the components (e.g., the CNM-g-polyamide 102, the thermoplastic polymer, the carrier fluid 104, excess emulsion stabilizer 106, and the like) different shapes of the structures that compose the CNM-g-polyamide particles 124/130 may be produced. Typically, the CNM-g-polyamide particles 124/130 comprise substantially spherical particles (having a circularity of about 0.97 or greater). However, other structures including disc and elongated structures may be observed in the CNM-g-polyamide particles 124/130. Therefore, the CNM-g-polyamide particles 124/130 may comprise one or more of: (a) substantially spherical particles having a circularity of 0.97 or greater, (b) disc structures having an aspect ratio of about 2 to about 10, and (c) elongated structures having an aspect ratio of 10 or greater. Each of the (a), (b), and (c) structures have emulsion stabilizers dispersed on an outer surface of the (a), (b), and (c) structures and/or embedded in an outer portion of the (a), (b), and (c) structures. At least some of the (a), (b), and (c) structures may be agglomerated. For example, the (c) elongated structures may be laying on the surface of the (a) substantially spherical particles.

The CNM-g-polyamide particles 124/130 may have a sintering window that is within 10° C., preferably within 5° C., of the sintering window of the polyamide of the CNM-g-polyamide.

The CNM-g-polyamide particles 124/130 may have a melting point ranging from about 170° C. to about 200° C. (or from about 175° C. to about 195° C., or from about 180° C. to about 190° C., such as from about 185° C. to about 190° C.).

The CNM-g-polyamide particles 124/130 may have a crystallization temperature ranging from about 130° C. to about 170° C. (or from about 135° C. to about 165° C., or from about 140° C. to about 160° C., such as from about 145° C. to about 155° C.).

The CNM-g-polyamide particles 124/130 may have a crystallinity ranging from about 20% to about 40% (or from about 22% to about 38%, or from about 24% to about 36%, or from about 26% to about 34%, or from about 28% to about 32%, or from about 20% to about 30%, or from about 22% to about 28%).

The CNM-g-polyamide particles 124/130 may have an MFI flow rate ranging from about 0.5 g/10 min to about 10 g/10 min (or from about 1 g/10 min to about 8 g/10 min, or from about 1.5 g/10 min to about 6 g/10 min, or from about 2 g/10 min to about 5 g/10 min).

The CNM-g-polyamide particles 124/130 may provide a dimensional accuracy of the SLS parts ranging from 0.1% to about 5% (or from about 0.5% to about 4.5%, or from about 1% to about 4%).

The CNM-g-polyamide particles 124/130 may have a tensile strength ranging from about 50 MPa to about 200 Mpa (or from about 60 MPa to about 150 Mpa, or from about 80 MPa to about 100 Mpa).

Tensile strength and dimensional accuracy of the SLS parts of CNM-g-polyamide particles 124/130 of the present disclosure may be advantageously higher than that of typical polyamide particle SLS parts with the same processing parameters.

The CNM-g-polyamide particles 124/130 may have a tensile modulus (as fiber) ranging from about 400 MPa to about 1000 MPa (or from about 425 MPa to about 800 MPa, or from about 450 MPa to about 600 MPa, or from about 475 MPa to about 500 MPa, or from about 500 MPa to about 600 MPa).

The CNM-g-polyamide particles 124/130 may have an ultimate strength ranging from about 50 MPa to about 500 Mpa (or from about 60 MPa to about 450 Mpa, or from about 70 MPa to about 400 Mpa, or from about 80 MPa to about 350 Mpa, or from about 90 MPa to about 300 Mpa, or from about 100 MPa to about 250 Mpa, or from about 50 MPa to about 150 Mpa, or from about 80 MPa to about 120 Mpa).

The CNM-g-polyamide particles 124/130 may have a flexural modulus ranging from about 50 MPa to about 2000 Mpa (or from about 100 MPa to about 1500 Mpa, or from about 150 MPa to about 1000 Mpa, or from about 200 MPa to about 800 Mpa, or from about 500 MPa to about 1000 Mpa).

The CNM-g-polyamide particles 124/130 may have an elongation ranging from about 2% to about 20% (or from about 4% to about 18%, or from about 6% to about 16%, or from about 8% to about 14%, or from about 10% to about 12%, or from about 5% to about 15%, or from about 6% to about 12%, or from about 7% to about 10%).

Applications of CNM-g-Polyamides

The present disclosure also relates to methods of selective laser sintering where the method may comprise: depositing (a) highly spherical polymer particles comprising (a1) CNM-g-polyamide and optionally (a2) a thermoplastic polymer that is not the polyamide of the CNM-g-polyamide and is not grafted to a CNM and optionally (b) other thermoplastic polymer particles not comprising the CNM-g-polyamide onto a surface; and once deposited, exposing at least a portion of the spherical polymer particles to a laser to fuse the polymer particles and form a consolidated body.

The CNM-g-polyamide particles 124/130 described herein may be used to produce a variety of articles. By way of nonlimiting example, 3-D printing processes of the present disclosure may comprise: depositing CNM-g-polyamide particles 124/130 described herein upon a surface (e.g., in layers and/or in a specified shape), and once deposited, heating at least a portion of the particles to promote consolidation thereof and form a consolidated body (or object). The consolidated body may have a void percentage of about 5% or less (e.g., 0% to about 5%, or about 0.5% to about 2%, or about 1% to about 3%, or about 2% to about 5%) after being consolidated. For example, heating and consolidation of the polymer particles (e.g., CNM-g-polyamide particles 124/130 and other thermoplastic polymer particles) may take place in a 3-D printing apparatus employing a laser, such that heating and consolidation take place by selective laser sintering.

Examples of articles that may be produced by such methods where the CNM-g-polyamide particles 124/130 may be used to form all or a portion of said articles include, but are not limited to, particles, films, packaging, toys, household goods, automotive parts, aerospace/aircraft-related parts, containers (e.g., for food, beverages, cosmetics, personal care compositions, medicine, and the like), shoe soles, furniture parts, decorative home goods, plastic gears, screws, nuts, bolts, cable ties, jewelry, art, sculpture, medical items, prosthetics, orthopedic implants, production of artifacts that aid learning in education, 3D anatomy models to aid in surgeries, robotics, biomedical devices (orthotics), home appliances, dentistry, electronics, sporting goods, and the like. Further, particles may be useful in applications that include, but are not limited to, paints, powder coatings, ink jet materials, electrophotographic toners, 3D printing, and the like.

Example Embodiments

A first nonlimiting example embodiment of the present disclosure is a method of selective laser sintering, the method comprising: depositing carbon nanomaterial-graft-polyamide (CNM-g-polyamide) particles optionally in combination with other thermoplastic polymer particles onto a surface, wherein the CNM-g-polyamide particles comprise a polyamide grafted to a carbon nanomaterial (CNM); and after deposited, exposing at least a portion of the CNM-g-polyamide particles to a laser to fuse the polymer particles thereof and form a consolidated body by selective laser sintering. The first nonlimiting example embodiment may further include one or more of: Element 1: wherein the CNM-g-polyamide comprises 50 wt % to 99.95 wt % of the polyamide, and about 0.05 wt % to about 50 wt % of the carbon nanomaterial, based on the total weight of the CNM-g-polyamide; Element 2: wherein the polyamide is selected from the group consisting of: polycaproamide, poly(hexamethylene succinamide), polyhexamethylene adipamide, polypentamethylene adipamide, polyhexamethylene sebacamide, polyundecamide, polydodecamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof; Element 3: wherein the CNM is selected from the group consisting of a carbon nanotube, a graphite, a graphene, a fullerene, and any combinations thereof; Element 4: wherein a molar ratio of polyamide to CNM is of about 500:1 to about 1:500; Element 5: Element 4 and wherein a molar ratio of polyamide to CNM is of about 20:1 to about 10:1; Element 6: wherein the polyamide is grafted on surfaces of the CNM to produce CNM-g-polyamide by polycondensation, interfacial polymerization, or by ring opening polymerization (ROP); Element 7: Element 6 and wherein ROP is an in situ anionic ring opening polymerization (AROP); Element 8: Element 7 and wherein the in situ AROP is carried out in the presence of an initiator and optionally an activator; Element 9: Element 8 and wherein a weight ratio of the polyamide to the initiator is about 90:10 to about 99:1; Element 10: wherein the CNM-g-polyamide particles have a circularity of about 0.90 to about 1.0; Element 11: wherein the CNM-g-polyamide particles have an emulsion stabilizer embedded with an outer surface of the CNM-g-polyamide particles; Element 12: Element 11 and wherein the emulsion stabilizer comprises nanoparticles; Element 13: Element 11 and wherein at least some of the CNM-g-polyamide particles have a void comprising the emulsion stabilizer at a void/polymer interface; Element 14: Element 11 and wherein the emulsion stabilizer comprises nanoparticles and the nanoparticles are embedded in the void/polymer interface; Element 15: wherein CNM-g-polyamide comprising polymer particles further comprises: a thermoplastic polymer not grafted to a CNM; Element 16: wherein CNM-g-polyamide comprising polymer particles further comprises: a carrier fluid that is immiscible with the polyamide of the CNM-g-polyamide; Element 17: Element 16 and wherein the carrier fluid is present at a weight ratio of the carrier fluid to a combination of the CNM-g-polyamide and the thermoplastic polymer ranging from 50:50 to 90:10; Element 18: wherein CNM-g-polyamide particles have a D10 of about 0.1 μm to about 125 μm, a D50 of about 0.5 μm to about 200 μm, and a D90 of about 3 μm to about 300 μm, and wherein D10<D50<D90; Element 19: wherein CNM-g-polyamide particles have a diameter span of about 0.2 to about 10; Element 20: wherein CNM-g-polyamide particles have an angle of repose of about 25° to about 45°; and Element 21: wherein CNM-g-polyamide particles a Hausner ratio of about 1.0 to about 1.5. Examples of combinations include, but are not limited to, two or more of Elements 6, 7, and 10 in combination; Element 1 in combination with one or more of Elements 2-21; Element 2 in combination with one or more of Elements 3-21; Element 3 in combination with one or more of Elements 4-21; Element 5 in combination with one or more of Elements 6-21; Element 7 in combination with one or more of Elements 8-21; Element 8 in combination with one or more of Elements 9-21; Element 9 in combination with one or more of Elements 10-21; Element 11 in combination with one or more of Elements 12-21; Element 12 in combination with one or more of Elements 13-21; two or more of Elements 14-21 in combination; and two or more of Elements 18-21 in combination.

A second nonlimiting example embodiment of the present disclosure is a composition comprising: CNM-g-polyamide particles comprising a polyamide grafted to a carbon nanomaterial. The CNM-g-polyamide particles may include the CNM at about 0.05 wt % to about 50 wt % of the CNM-g-polyamide particles, and the CNM may be selected from the group consisting of a carbon nanotube, a graphite, a graphene, a fullerene, and any combinations thereof. The second nonlimiting example embodiment may further include one or more of: Element 18: wherein the polyamide is selected from the group consisting of: polycaproamide, poly(hexamethylene succinamide), polyhexamethylene adipamide, polypentamethylene adipamide, polyhexamethylene sebacamide, polyundecamide, polydodecamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof. The second nonlimiting example embodiment may further include one or more of: Element 1; Element 2; Element 3; Element 4; Element 5; Element 6; Element 7; Element 8; Element 9; Element 10; Element 11; Element 12; Element 13; Element 14; Element 15; Element 16; Element 17; Element 18; Element 19; Element 20; and Element 21.

A third nonlimiting example embodiment is a method comprising: mixing a mixture comprising: (a) carbon nanomaterial-graft-polyamide (CNM-g-polyamide), wherein the CNM-g-polyamide particles comprises: a polyamide grafted to a carbon nanomaterial, (b) a carrier fluid that is immiscible with the polyamide of the CNM-g-polyamide, optionally (c) a thermoplastic polymer not grafted to a CNM, and optionally (d) an emulsion stabilizer at a temperature greater than a melting point or softening temperature of the polyamide of the CNM-g-polyamide and the thermoplastic polymer, when included, and at a shear rate sufficiently high to disperse the CNM-g-polyamide in the carrier fluid; cooling the mixture to below the melting point or softening temperature to form CNM-g-polyamide particles; and separating the CNM-g-polyamide particles from the carrier fluid. The third nonlimiting example embodiment may further include one or more of: Element 1; Element 2; Element 3; Element 4; Element 5; Element 6; Element 7; Element 8; Element 9; Element 10; Element 11; Element 12; Element 13; Element 14; Element 15; Element 16; Element 17; Element 18; Element 19; Element 20; Element 21; Element 22: wherein the carrier fluid is polydimethylsiloxane (PDMS).

Clauses

Clause 1. A method of selective laser sintering, the method comprising: depositing carbon nanomaterial-graft-polyamide (CNM-g-polyamide) particles optionally in combination with other thermoplastic polymer particles onto a surface, wherein the CNM-g-polyamide particles comprise a polyamide grafted to a carbon nanomaterial (CNM); and after deposited, exposing at least a portion of the CNM-g-polyamide particles to a laser to fuse the polymer particles thereof and form a consolidated body by selective laser sintering.

Clause 2. The method of Clause 1, wherein the CNM-g-polyamide comprises 50 wt % to 99.95 wt % of the polyamide, and about 0.05 wt % to about 50 wt % of the carbon nanomaterial, based on the total weight of the CNM-g-polyamide.

Clause 3. The method of Clause 1, wherein the polyamide is selected from the group consisting of: polycaproamide, poly(hexamethylene succinamide), polyhexamethylene adipamide, polypentamethylene adipamide, polyhexamethylene sebacamide, polyundecamide, polydodecamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof.

Clause 4. The method of Clause 1, wherein the CNM is selected from the group consisting of a carbon nanotube, a graphite, a graphene, a fullerene, and any combinations thereof.

Clause 5. The method of Clause 1, wherein a molar ratio of polyamide to CNM is of about 500:1 to about 1:500.

Clause 6. The method of Clause 5, wherein a molar ratio of polyamide to CNM is of about 20:1 to about 10:1.

Clause 7. The method of Clause 1, wherein the polyamide is grafted on surfaces of the CNM to produce CNM-g-polyamide by polycondensation, interfacial polymerization, or by ring opening polymerization (ROP).

Clause 8. The method of Clause 7, wherein ROP is an in situ anionic ring opening polymerization (AROP).

Clause 9. The method of Clause 8, wherein the in situ AROP is carried out in the presence of an initiator and optionally an activator.

Clause 10. The method of Clause 9, wherein a weight ratio of the polyamide to the initiator is about 90:10 to about 99:1.

Clause 11. The method of Clause 1, wherein the CNM-g-polyamide particles have a circularity of about 0.90 to about 1.0.

Clause 12. The method of Clause 1, wherein the CNM-g-polyamide particles have an emulsion stabilizer embedded with an outer surface of the CNM-g-polyamide particles.

Clause 13. The method of Clause 12, wherein the emulsion stabilizer comprises nanoparticles.

Clause 14. The method of Clause 12, wherein at least some of the CNM-g-polyamide particles have a void comprising the emulsion stabilizer at a void/polymer interface.

Clause 15. The method of Clause 12, wherein the emulsion stabilizer comprises nanoparticles and the nanoparticles are embedded in the void/polymer interface.

Clause 16. The method of Clause 1, wherein CNM-g-polyamide comprising polymer particles further comprises: a thermoplastic polymer not grafted to a CNM.

Clause 17. The method of Clause 1, wherein CNM-g-polyamide comprising polymer particles further comprises: a carrier fluid that is immiscible with the polyamide of the CNM-g-polyamide.

Clause 18. The method of Clause 17, wherein the carrier fluid is present at a weight ratio of the carrier fluid to a combination of the CNM-g-polyamide and the thermoplastic polymer ranging from 50:50 to 90:10.

Clause 19. The method of Clause 1, wherein CNM-g-polyamide particles have a D10 of about 0.1 µm to about 125 µm, a D50 of about 0.5 µm to about 200 µm, and a D90 of about 3 µm to about 300 µm, and wherein D10<D50<D90.

Clause 20. The method of Clause 1, wherein CNM-g-polyamide particles have a diameter span of about 0.2 to about 10.

Clause 21. The method of Clause 1, wherein CNM-g-polyamide particles have an angle of repose of about 250 to about 45°.

Clause 22. The method of Clause 1, wherein CNM-g-polyamide particles a Hausner ratio of about 1.0 to about 1.5.

Clause 23. A composition comprising: CNM-g-polyamide particles comprising a polyamide grafted to a carbon nanomaterial. The CNM-g-polyamide particles may include the CNM at about 0.05 wt % to about 50 wt % of the CNM-g-polyamide particles, and the CNM may be selected from the group consisting of a carbon nanotube, a graphite, a graphene, a fullerene, and any combinations thereof.

Clause 24. The composition of Clause 23, wherein the polyamide is selected from the group consisting of: polycaproamide, poly(hexamethylene succinamide), polyhexamethylene adipamide, polypentamethylene adipamide, polyhexamethylene sebacamide, polyundecamide, polydodecamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof.

Clause 25. The composition of Clause 23, wherein the CNM-g-polyamide particles have a circularity of about 0.90 to about 1.0.

Clause 26. The composition of Clause 23, wherein the CNM-g-polyamide particles have an emulsion stabilizer embedded with an outer surface of the CNM-g-polyamide particles.

Clause 27. The composition of Clause 23, wherein the emulsion stabilizer comprises nanoparticles.

Clause 28. The composition of Clause 23, wherein the CNM-g-polyamide particles have a D10 of about 0.1 µm to about 125 µm, a D50 of about 0.5 µm to about 200 µm, and a D90 of about 3 µm to about 300 µm, and wherein D10<D50<D90.

Clause 29. The composition of Clause 23, wherein the CNM-g-polyamide particles have a diameter span of about 0.2 to about 10.

Clause 30. The composition of Clause 23, wherein the CNM-g-polyamide particles have an angle of repose of about 250 to about 45°.

Clause 31. The composition of Clause 23, wherein the CNM-g-polyamide particles a Hausner ratio of about 1.0 to about 1.5.

Clause 32. A method comprising: mixing a mixture comprising: (a) carbon nanomaterial-graft-polyamide (CNM-g-polyamide), wherein the CNM-g-polyamide particles comprises: a polyamide grafted to a carbon nanomaterial, (b) a carrier fluid that is immiscible with the polyamide of the CNM-g-polyamide, optionally (c) a thermoplastic polymer not grafted to a CNM, and optionally (d) an emulsion stabilizer at a temperature greater than a melting point or softening temperature of the polyamide of the CNM-g-polyamide and the thermoplastic polymer, when included, and at a shear rate sufficiently high to disperse the CNM-g-polyamide in the carrier fluid; cooling the mixture to below the melting point or softening temperature to form CNM-g-polyamide particles; and separating the CNM-g-polyamide particles from the carrier fluid.

Clause 33. The method of Clause 32, wherein the polyamide is selected from the group consisting of: polycaproamide, poly(hexamethylene succinamide), polyhexamethylene adipamide, polypentamethylene adipamide, polyhexamethylene sebacamide, polyundecamide, polydodecamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof.

Clause 34. The method of Clause 32, wherein the CNM-g-polyamide comprises 50 wt % to 99.95 wt % of the polyamide, and about 0.05 wt % to about 50 wt % of the carbon nanomaterial, based on the total weight of the CNM-g-polyamide.

Clause 35. The method of Clause 32, wherein the carrier fluid is present at a weight ratio of the carrier fluid to a combination of the CNM-g-polyamide and the thermoplastic polymer ranging from 50:50 to 90:10.

Clause 36. The method of Clause 32, wherein the carrier fluid is polydimethylsiloxane (PDMS).

Clause 37. The method of Clause 32, wherein the CNM-g-polyamide particles have a circularity of about 0.90 to about 1.0.

Clause 38. The method of Clause 32, wherein the CNM-g-polyamide particles have an emulsion stabilizer embedded with an outer surface of the CNM-g-polyamide particles.

Clause 39. The method of Clause 32, wherein the emulsion stabilizer comprises nanoparticles.

Clause 40. The method of Clause 32, wherein CNM-g-polyolefin particles have a D10 of about 0.1 µm to about 125 µm, a D50 of about 0.5 µm to about 200 µm, and a D90 of about 3 µm to about 300 µm, and wherein D10<D50<D90.

Clause 41. The method of Clause 32, wherein CNM-g-polyolefin particles have a diameter span of about 0.2 to about 10.

Clause 42. The method of Clause 32, wherein CNM-g-polyolefin particles have an angle of repose of about 250 to about 45°.

Clause 43. The method of Clause 32, wherein CNM-g-polyolefin particles a Hausner ratio of about 1.0 to about 1.5.

Unless otherwise indicated, all numbers expressing quantities of ingredients, properties such as molecular weight, process conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the disclosure embodiments disclosed herein are presented herein. Not all features of a physical implementation are described or shown in this application for the sake of clarity. It is understood that in the development of a physical embodiment incorporating the embodiments of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present disclosure, the following examples of preferred or representative embodiments are given. In no way should the following examples be read to limit, or to define, the scope of the disclosure.

EXAMPLES

Figure 2:
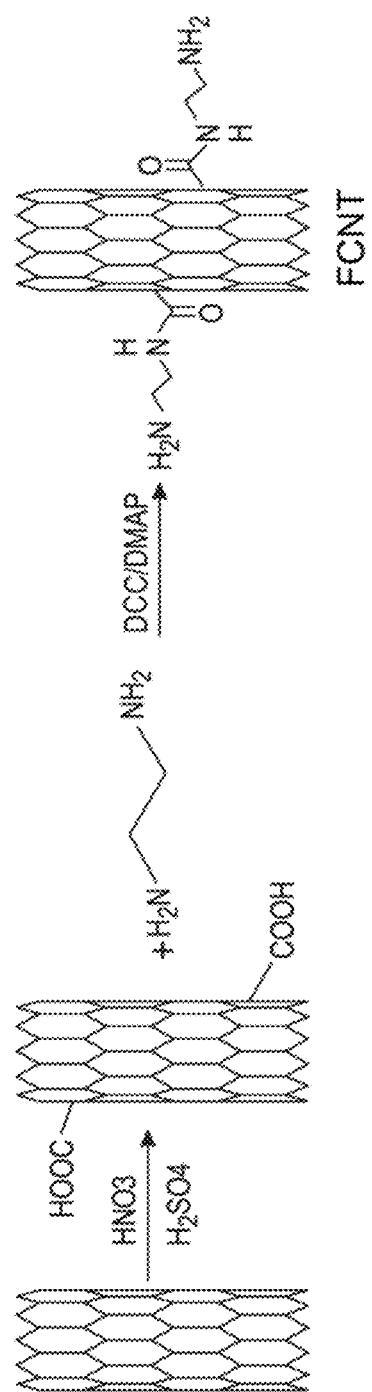
FIG. 2 shows Scheme 1.

Prophetic Example 1a. Preparation of amino-functionalized carbon nanotubes for polyamide synthesis is described. FIG. 2 shows Scheme 1, which illustrates a nonlimiting synthetic route example of amino-functionalized CNTs via acidification. A CNT, such as a multiwalled carbon nanotube (MWCNT), may be first oxidized via a mixture of concentrated sulfuric acid with nitric acid at a volume ratio of 3:1. The acidification may take place by sonication of the CNT in the acid solution at 50° C. for 3 hours in an ultrasonic bath. The resulting CNT/acid mixture may then be poured into deionized water, filtered and washed repeatedly until the pH value of the filtration solution is about 7 (neutral pH). The acidified CNT product (CNT-COOH) may then be dried in a vacuum oven at 80° C. for 6 hours. About 1 g of CNT-COOH may be dispersed in 2 L of THF under sonication for at least 1 hour. To this dispersion, while stirring at ambient temperature, may be added 20 g (340 mmol)

ethylenediamine (EDA), 1 g (10 mmol) 4-(dimethylamino) pyridine (DMAP), and 10 g (50 mmol) N,N'-dicyclohexylcarbodiimide (DCC). The dispersion/solution may be heated to 60° C. and may be held at this temperature for 24 hours with stirring. The product may be a black solid which may be easily collected and washed three times with THF (1 L to 1.5 L per wash). The product may be dried in a vacuum oven to obtain the amino-functionalized CNT. Further functionalization (e.g., amino group) may enable improved reactivity of the CNT with the polyamide monomers. The direct CNT-COOH route may be used directly to prepare the polyamide/CNT, although lower reactivity may be observed due to the reduced mobility due to the COOH directly attached to the surface of the CNT and not extended out like the amino group.

Figure 3:
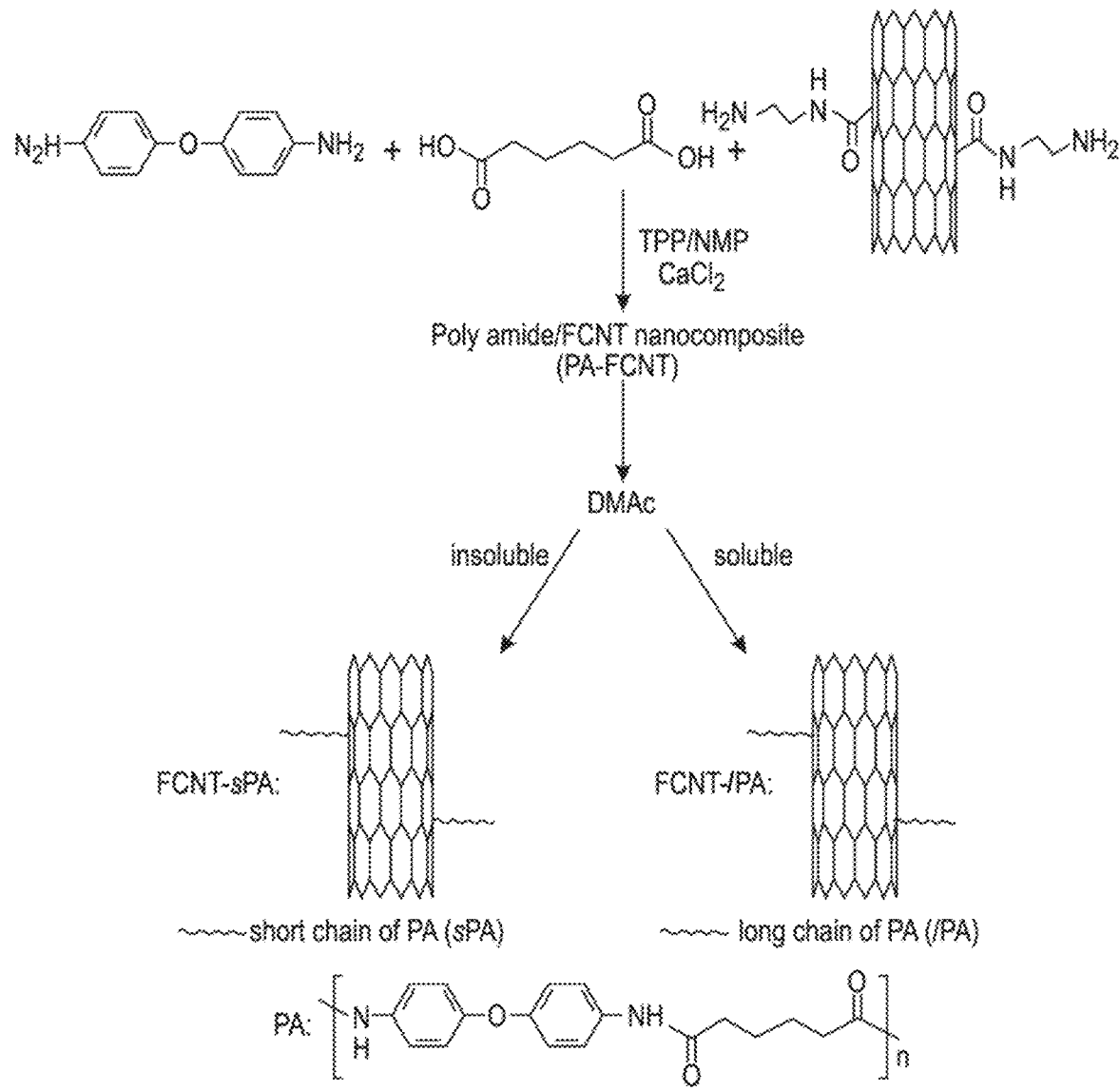
FIG. 3 shows Scheme 2.

Prophetic Example 1b. Preparation of the polyamide/amino functionalized CNT (PA/CNT) nanocomposite via in situ polycondensation is described. FIG. 3 shows Scheme 2, which illustrates a nonlimiting example of the synthesis of a polyamide with amino-functionalized CNT (FCNT) resulting in insoluble short chain PA/FCNT and soluble long chain PA/FCNT. A 2 wt % PA/CNT nanocomposite may be prepared by dispersing 0.497 g of the amino-FCNT (e.g., from Example 1a) in N-methyl-2-pyrrolidone (NMP) (60 ml) while sonicating for 30 minutes. The final mixture may be a homogeneous solution of the amino-FCNT. The resulting mixture may be transferred to a 1 L three-necked flask equipped with a magnetic stirrer or overhead stirrer. To the said flask, may be added 10 g adipic acid (68 mmol), 17 g 4,4-diaminodiphenyl sulphone (68 mmol), 3 g calcium chloride (18 mmol), 42.4 ml triphenyl phosphite (137 mmol), and pyridine (7 ml). The reaction may be carried out at 60° C. for 1 hour, at 90° C. for 2 hours, and 120° C. for 8 hours, respectively, which may result in a viscous mixture. The viscous mixture may be precipitated in 500 ml methanol to obtain the PA/CNT. The precipitate can be collected by filtration and washed thoroughly with hot methanol at a temperature ranging from about 45° C. to about 50° C.

If required, the short and long polymeric grafted CNTs may be separated by solvent solubility differences (Scheme 2). The grafted PA/CNTs may be dispersed in 250 ml of N,N-dimethylacetamide (DMAc), and may be stirred for 1 hour at 65° C. The material with shorter polymer CNT chains may be filtered onto filter paper to recover the solid product and may be dried for about 12 hours at 95° C. in a vacuum oven. The DMAc solution, which may be dark in color, may be poured into 500 ml water to encourage precipitation of the long chained polymeric CNT product. The long chained polymeric CNT product may be collected by filtration, washed thoroughly several times with methanol, and dried in a vacuum oven at 95° C. for 12 hours.

Figure 4:
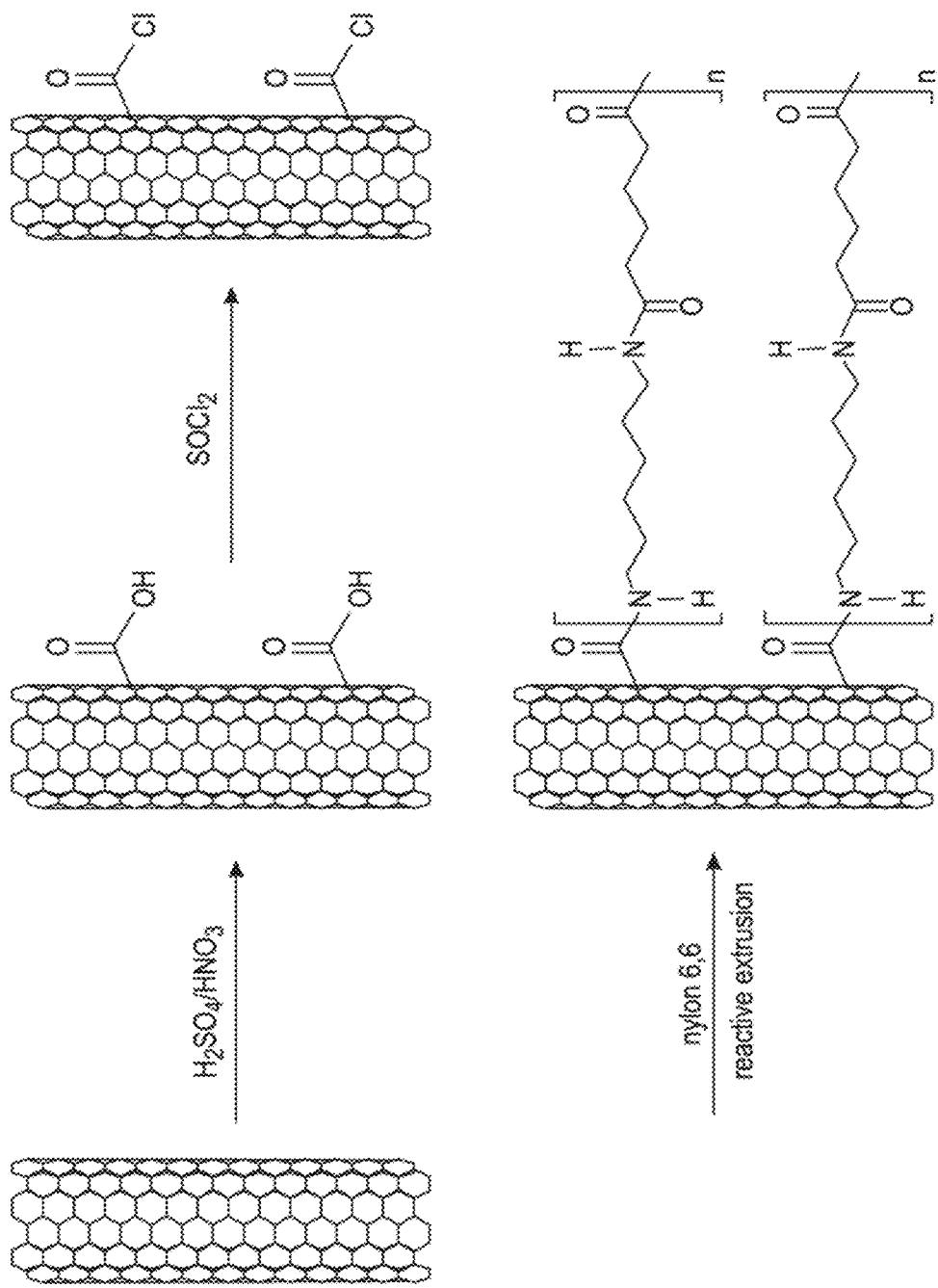
FIG. 4 shows Scheme 3.

Prophetic Example 2. Preparation of polyhexamethylene adipamide-MWCNT graft composites (polyamide 6,6-MWCNT graft composites) via reactive extrusion for fabrication of SLS powders by melt emulsification is described. FIG. 4 shows Scheme 3, which illustrates a nonlimiting example of a reactive extrusion approach which may be used as a synthetic route for preparation of polyamide 6,6 grafted MWCNT, where the COCl grafted MWCNTs may react with the amine end-groups of PA6,6. As discussed above, pristine MWCNTs may be functionalized with $H_2SO_4$/$HNO_3$ where 1 gram of MWCNTs may be mixed with the $H_2SO_4$ (conc. 98 vol. %) and $HNO_3$ (conc. 70 vol. %) at a ratio of $H_2SO_4$:$HNO_3$ of 3/2 by volume (2000 ml total). The mixture may be heated to 60° C. while refluxing for 24 hours. Then, the mixture may be diluted with about 1 L deionized water (DIW), and may be filtered through a 450 nm nylon membrane. The MWCNTs may be further washed with DIW (5×200 ml), and then dried in a vacuum oven for 24 hours at ambient temperature. The resulting COOH functionalized MWCNTs (MWCNT-COOH) may be dispersed in thionyl chloride ($SOCl_2$) (500 ml) in a sonicator for 2 hours, and may further be stirred for another 24 hours at 70° C. Further, the mixture may be vacuum-filtered through a 450 nm nylon membrane, and washed with tetrahydrofuran (3×200 ml) and ethanol (3×200 ml). The resulting MWCNT-COCl may be dried for 12 hours in a vacuum oven at ambient temperature.

Reactive extrusion may be used to prepare the polyamide 6,6-MWCNTs (50 g PA6,6 with 2 wt % MWCNT-COCl), where a twin extruder with 4 different zones may be used for feeding (265° C.), melting (280° C.), mixing (280° C.), and exit (260° C.). The material feed rate and extrusion speed may be held constant at 10 g/min and 300 rpm, respectively. As extruded, the melt-mixed composites may be quenched in a water bath. The composite may be dissolved in formic acid (about 3 L for 50 g composite) to remove unreacted PA6,6 from the PA6,6-MWCNT via centrifugation at about 4000 xg to about 10,000 xg, for about 10 minutes or more (or about 20 minutes or more, or about 30 minutes or more), at 4° C. The collected PA6,6-MWCNT may be redispersed in formic acid again (3 L) and collected again via centrifugation to further remove unreacted PA6,6. This procedure may be repeated 5 times or more and the resulting product may be washed with formic acid (3 L×3), and may be dried for 12 hours in a vacuum oven at 30° C. The resulting PA6,6-MWCNT may be confirmed by Fourier-transform infrared spectroscopy (FT-IR), X-ray photoelectron spectroscopy (XPS), field emission scanning electron microscopy (FE-SEM), and thermogravimetric analysis (TGA). The tensile modulus and yield strengths of the composites is expected to be higher than the PA6,6 alone or the melt mixed version of the PA6,6 with pristine MWCNT, thus due to the strong interfacial adhesion and reinforcement via hydrogen bonding and chain entanglement between the PA6,6 matrix and PA6,6 grafted on the MWCNTs. The resulting composite may be converted into its corresponding spherical particles for use in a selective laser sintering (SLS) 3D printer.

Prophetic Example 3. Preparation of PA-CNT microparticles by melt emulsification is described. Microparticles may be produced from the polyamide-CNT nanocomposite prepared in Prophetic Example 1b and Prophetic Example 2 by melt extrusion in a HAAKE™ RHEOMIX twin screw extruder with high shear rotors. The extruder may be brought to a temperature around the melting point of the polymer and the rotors may be started at a slow speed (ranging from 50 rpm to 100 rpm, then up to 250 rpm). The PA-CNT polymer pellets from either of the above examples may be added to the heated extruder followed by the carrier fluid. The carrier fluid may be PDMS oil having a viscosity of 10,000 cSt to 60,000 cSt at room temperature. The ratio of PDMS oil to polymer may be 70:30 or 30% polymer solids in 70% oil. An optional dispersing agent or flow aid may be added prior to the carrier fluid to aid with the flow of the dried particles. The extruder may be operated at 200 rpm (maximum speed) for 30 minutes. The mixture may be discharged onto a metal tray with dry ice to provide rapid quench cooling. Once the dry ice has sublimated, the oil may be washed away from the microparticles with three heptane washes and the microparticles may be isolated by vacuum filtration. The microparticles may then be dried overnight in a vacuum oven at room temperature to allow any residual heptane to evaporate. The dried particles may be sieved through a 150 m or 250 m screen. The resulting powder may have a final average particle size (D50) of approximately 50 microns and a span of approximately 1.000.

Prophetic Control Example 1. Preparation of polydodecaamide (nylon 12, polyamide 12, or PA12) and PA6,6 microparticles by melt emulsification is described. Unfilled PA12 or PA6,6 powder may be prepared from the corresponding pellets by melt extrusion using the same procedure as described in Prophetic Example 3.

Prophetic Control Example 2. Preparation of PA12 melt mixed microparticles and PA6,6 melt mixed microparticles with CNTs (e.g., MWCNTs) by melt emulsification is described. PA12 or PA6,6 may be physically melt mixed with CNTs to produce microparticles by the same melt extrusion process described in Prophetic Example 3. The CNT may be added after the polyamide resin pellets may be fed into the chamber at a lower speed and sufficiently melted by bringing the temperature close to the melting point of the polymer.

SLS Printing and Mechanical Testing.

Baseline performance of the dried powders may be determined by sintering the material using a SNOWWHITE SLS printer (available from Sharebot). The SNOWWHITE SLS printer is a professional 3D printer that uses a $CO_2$ laser to sinter thermoplastic powders in a layer by layer fashion. The laser selectively fuses the material by scanning cross-sections of the desired object generated using a computer-aided design (CAD) model. After the first layer is scanned, the powder bed is lowered, new powder material is rolled on top and the subsequent layer is scanned until the part is completed. The main advantage of this powder-based system compared with other additive manufacturing techniques is the elimination of printing supports and the ability to reuse materials.

Mechanical properties of Prophetic Example 1b, Prophetic Example 2, Comparative Example 1, and Comparative Example 2 may be determined by printing ASTM Tensile D638-14, Type V Dogbone bars on the SNOWWHITE SLS printer.

Therefore, the present disclosure is well adapted to attain the ends and advantages mentioned as well as those that are inherent therein. The particular examples and configurations disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present disclosure. The present disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method of selective laser sintering, comprising:
providing carbon nanomaterial-graft-polyamide (CNM-g-polyamide) particles optionally in combination with other thermoplastic polymer particles, wherein the CNM-g-polyamide particles comprise a polyamide directly grafted to an amine functional group of an amino-functionalized carbon nanomaterial (CNM) or a polyamide directly grafted to a carboxylic acid functional group of a carboxylic acid-functionalized carbon nanomaterial (CNM);
depositing the CNM-g-polyamide particles onto a surface; and
once deposited, exposing at least a portion of the CNM-g-polyamide particles to a laser to fuse the particles and form a consolidated body by selective laser sintering.

2. The method of claim 1, wherein the CNM-g-polyamide comprises 50 wt % to 99.95 wt % of the polyamide, and about 0.05 wt % to about 50 wt % of the carbon nanomaterial, based on a total weight of the CNM-g-polyamide.

3. The method of claim 1, wherein the polyamide is selected from the group consisting of polycaproamide, poly (hexamethylene succinamide), polyhexamethylene adipamide, polypentamethylene adipamide, polyhexamethylene sebacamide, polyundecamide, polydodecamide, polyhexamethylene terephthalamide, nylon 10,10, nylon 10,12, nylon 10,14, nylon 10,18, nylon 6,18, nylon 6,12, nylon 6,14, nylon 12,12, a semi-aromatic polyamide, an aromatic polyamide, any copolymer thereof, and any combination thereof.

4. The method of claim 1, wherein the amino-functionalized CNM is selected from the group consisting of an amino-functionalized carbon nanotube, an amino-functionalized graphite, an amino-functionalized graphene, an amino-functionalized fullerene, and any combination thereof; and the carboxylic acid-functionalized CNM is selected from the group consisting of a carboxylic acid-functionalized carbon nanotube, a carboxylic acid-functionalized graphite, a carboxylic acid-functionalized graphene, a carboxylic acid-functionalized fullerene, and any combination thereof.

5. The method of claim 1, wherein a molar ratio of polyamide to CNM is of about 500:1 to about 1:500.

6. The method of claim 5, wherein a molar ratio of polyamide to CNM is of about 20:1 to about 10:1.

7. The method of claim 1, wherein the polyamide is formed by a polycondensation reaction in the presence of the amino-functionalized CNM or the carboxylic acid-functionalized CNM, wherein the amine functional group or the carboxylic acid functional group is used as a handle that participates in the polycondensation reaction such that the resultant polyamide is grafted to the CNM at said functional group.

8. The method of claim 7, wherein the polycondensation reaction is performed in the presence of an activator and/or metal salts.

9. The method of claim 7, wherein the polycondensation reaction is performed at a temperature of about 50° C. to about 200° C. for about 5 minutes to about 24 hours.

10. The method of claim 7, wherein the polycondensation reaction is performed in a solvent.

11. The method of claim 1, wherein the CNM-g-polyamide particles have a circularity of about 0.90 to about 1.0.

12. The method of claim 1, wherein the CNM-g-polyamide particles have an emulsion stabilizer embedded within an outer surface of the CNM-g-polyamide particles.

13. The method of claim 12, wherein the emulsion stabilizer comprises nanoparticles.

14. The method of claim 12, wherein the emulsion stabilizer comprises nanoparticles and the nanoparticles are embedded in a void/polymer interface.

15. The method of claim 1, wherein the CNM-g-polyamide particles further comprise a thermoplastic polymer not grafted to a CNM.

16. The method of claim 1, wherein the CNM-g-polyamide particles have a D10 of about 0.1 µm to about 125 µm, a D50 of about 0.5 µm to about 200 µm, and a D90 of about 3 µm to about 300 µm, and wherein D10<D50<D90.

17. The method of claim 1, wherein the CNM-g-polyamide particles have a diameter span of about 0.2 to about 10.

18. The method of claim 1, wherein the CNM-g-polyamide particles have an angle of repose of about 25° to about 45°.

19. The method of claim 1, wherein CNM-g-polyamide particles have a Hausner ratio of about 1.0 to about 1.5.

\* \* \* \* \*